(12) United States Patent
Lee et al.

(10) Patent No.: US 12,211,500 B2
(45) Date of Patent: Jan. 28, 2025

(54) ELECTRONIC DEVICE AND METHOD FOR PROCESSING USER INPUT

(71) Applicant: Samsung Electronics Co., Ltd., Gyeonggi-do (KR)

(72) Inventors: Seungyup Lee, Gyeonggi-do (KR); Hyeonjeong Kim, Gyeonggi-do (KR); Jaehwan Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 17/901,038

(22) Filed: Sep. 1, 2022

(65) Prior Publication Data
US 2022/0415325 A1    Dec. 29, 2022

Related U.S. Application Data

(63) Continuation of application No. PCT/KR2021/003453, filed on Mar. 19, 2021.

(30) Foreign Application Priority Data

Mar. 19, 2020 (KR) .................. 10-2020-0033740

(51) Int. Cl.
    *G10L 15/22*    (2006.01)
    *G10L 15/20*    (2006.01)
(52) U.S. Cl.
    CPC .............. *G10L 15/22* (2013.01); *G10L 15/20* (2013.01); *G10L 2015/223* (2013.01); *G10L 2015/228* (2013.01)

(58) Field of Classification Search
    CPC ... G10L 15/22; G10L 15/20; G10L 2015/223; G10L 2015/228; G10L 15/063; G10L 17/04; G06F 3/16; G06F 3/167; G06N 20/00
    See application file for complete search history.

(56) References Cited

U.S. PATENT DOCUMENTS

| 9,318,107 B1 * | 4/2016 | Sharifi ..................... G10L 15/22 |
| 9,454,336 B1 * | 9/2016 | Rudradevan ............ H04W 4/80 |
| 9,721,566 B2 | 8/2017 | Newendorp et al. |

(Continued)

FOREIGN PATENT DOCUMENTS

| KR | 10-2018-0125241 A | 11/2018 |
| KR | 10-2018-0130316 A | 12/2018 |

(Continued)

*Primary Examiner* — Fariba Sirjani
(74) *Attorney, Agent, or Firm* — Cha & Reiter, LLC

(57) ABSTRACT

An electronic device and method are disclosed herein. The electronic device includes a communication circuit, a processor, and a memory. The processor implements the method, including: receiving, from each of one or more external devices receiving a voice signal of a user, via the communication circuit, a first probability value based on usage frequency, and a second probability value based on signal-to-noise (SNR) magnitude, calculating final probability values for each of the one or more external devices, based on respective first and second probability values of each of the one or more external devices, and selecting an external device from among the one or more external devices having a highest final probability value from among the calculated final probability values.

18 Claims, 14 Drawing Sheets

Fridge

Speaker

(56) References Cited

U.S. PATENT DOCUMENTS

| | | | |
|---|---|---|---|
| 10,026,399 B2 | 7/2018 | Gopalan et al. | |
| 10,311,871 B2 | 6/2019 | Newendorp et al. | |
| 10,347,253 B2* | 7/2019 | Foerster | G10L 15/22 |
| 10,361,596 B1* | 7/2019 | Al-Habob | H04B 5/79 |
| 11,189,268 B2 | 11/2021 | Park et al. | |
| 11,211,058 B1* | 12/2021 | Eakin | G10L 15/197 |
| 11,880,559 B2* | 1/2024 | Sharifi | G06F 3/165 |
| 2008/0177623 A1* | 7/2008 | Fritsch | G06Q 10/10 |
| | | | 705/7.42 |
| 2009/0248419 A1* | 10/2009 | Spaulding | G10L 15/22 |
| | | | 704/E11.001 |
| 2013/0051382 A1* | 2/2013 | Derham | H04B 7/043 |
| | | | 370/345 |
| 2013/0260757 A1* | 10/2013 | Deivasigamani | H04W 48/18 |
| | | | 455/435.2 |
| 2017/0076720 A1* | 3/2017 | Gopalan | G10L 15/22 |
| 2017/0076721 A1* | 3/2017 | Bargetzi | G10L 15/22 |
| 2018/0137857 A1* | 5/2018 | Zhou | G10L 15/16 |
| 2018/0276197 A1 | 9/2018 | Nell et al. | |
| 2019/0244618 A1 | 8/2019 | Newendorp et al. | |
| 2019/0385594 A1* | 12/2019 | Park | G10L 15/22 |
| 2022/0238104 A1* | 7/2022 | Li | G10L 25/18 |
| 2022/0415325 A1* | 12/2022 | Lee | G10L 15/20 |

FOREIGN PATENT DOCUMENTS

| | | |
|---|---|---|
| KR | 10-2019-0064314 A | 6/2019 |
| KR | 10-2019-0075870 A | 7/2019 |
| KR | 10-2019-0096861 A | 8/2019 |
| KR | 10-2228549 B1 | 3/2021 |

* cited by examiner

| Device | Usage freq.$_{voice}$ | Weight for Usage freq.$_{voice}$ | Usage freq.$_{manual}$ | Weight for Total Usage freq.$_{manual}$ | Total Usage freq. | Normalized usage freq. |
|---|---|---|---|---|---|---|
| Fridge | 15 | 0.7 | 3 | 0.3 | 11.4 | 0.67 |
| Speaker | 20 | | 10 | | 17 | 1.0 |
| AC | 6 | | 40 | | 16.2 | 0.95 |

FIG.14

ELECTRONIC DEVICE AND METHOD FOR PROCESSING USER INPUT

CROSS-REFERENCE TO RELATED APPLICATION(S)

This application is a continuation of International Application No. PCT/KR2021/003453, which was filed on Mar. 19, 2021, and claims priority to Korean Patent Application No. KR10-2020-0033740, filed on Mar. 19, 2020, in the Korean Intellectual Property Office, the disclosures of which are incorporated by reference herein their entirety.

BACKGROUND

Technical Field

Embodiments disclosed in the disclosure relate to voice-control for electronic devices.

Description of Related Art

Many modern electronic devices support a variety of input methods beyond conventional inputs using keyboard and mouse. For example, voice inputs are often supported by smartphones and tablets, which allow a user to speak to the device, upon which a corresponding function or operation will be executed.

Speech recognition services of this type often involve natural language processing (NLP). NLP typically involves detecting a user intent associated with a user input or utterance, then detecting an intended result or function based on the user intent, and identifying a corresponding service for execution.

However, when there is a plurality of speech-recognition enabled devices, usability may suffer especially where no technological implementations exist for controlling operation of several devices.

SUMMARY

The present disclosure enables control of several devices each equipped with speech recognition service, even when the corresponding inputs are received overlapping in time and/or simultaneously.

The present disclosure therefore allows a more consistent user experience when user inputs are generated using wake-up words for speech recognition services.

In accordance with an aspect of the disclosure, an electronic device is provided. The electronic device may include a communication circuit; a processor operatively coupled to the communication circuit; and a memory operatively coupled to the processor, wherein the memory stores instructions that are executable by the processor to cause the electronic device to: receive, from each of one or more external devices receiving a voice signal of a user, via the communication circuit, a first probability value based on usage frequency, and a second probability value based on signal-to-noise (SNR) magnitude; calculate final probability values for each of the one or more external devices, based on respective first and second probability values of each of the one or more external devices; and select an external device from among the one or more external devices having a highest final probability value from among the calculated final probability values.

In accordance with another aspect of the disclosure, a method performed in an electronic device is provided. The method may include a voice receiver, wherein the voice signal is received via the voice receiver, wherein the one or more external devices includes a first electronic device and a second electronic device, and the instructions are further executable by the processor to: calculate for the first electronic device a first final probability value based on usage frequency of the first electronic device and a SNR magnitude of the first electronic device, calculate for the second electronic device a second final probability value based on usage frequency of the second electronic device and a SNR magnitude of the second electronic device, and compare at least the first final probability value to the second final probability value to select at least one of the first electronic device and the second electronic device, for executing a function corresponding to the received voice signal.

According to the present disclosure, more accurate selection of a device for execution of a corresponding operation, only based on a voice-based user input (e.g., such as a wake-up word), may be facilitated.

According to the present disclosure, a more consistent user experience may be created despite the present of multiple devices having speech recognition services.

In addition, various effects ascertained directly or indirectly through the disclosure may be provided.

BRIEF DESCRIPTION OF THE DRAWINGS

FIG. 14 is another drawing illustrating calculation of probability values according to a usage frequency of each execution candidate device.

With regard to description of drawings, the same or similar denotations may be used for the same or similar components.

DETAILED DESCRIPTION

Hereinafter, certain embodiments of the disclosure will be described with reference to the accompanying drawings.

However, it should be understood that this is not intended to limit the disclosure to specific implementation forms and includes various modifications, equivalents, and/or alternatives of embodiments of the disclosure.

Figure 1:
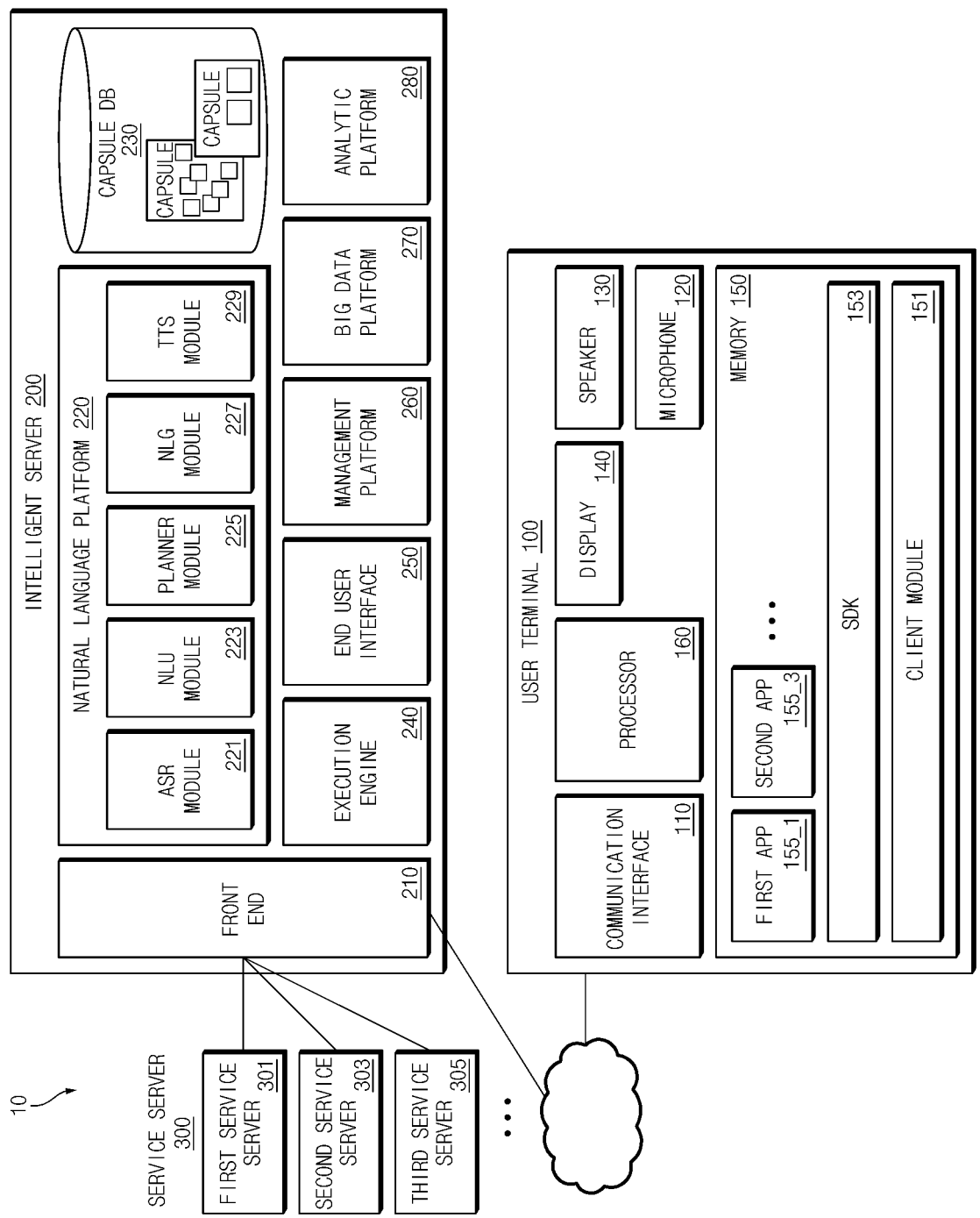
FIG. 1 is a block diagram illustrating an integrated intelligence system according to an embodiment.

FIG. 1 is a block diagram illustrating an integrated intelligence system according to an embodiment.

Referring to FIG. 1, the integrated intelligence system in an embodiment may include a user terminal 100, an intelligent server 200, and a service server 300.

The user terminal 100 in an embodiment may be a terminal device (or an electronic device 4401) connectable with the Internet, for example, a mobile phone, a smart phone, a personal digital assistant (PDA), a laptop computer, a television (TV), a white home appliance, a wearable device, a head mounted device (HMD), or a smart speaker.

According to the shown embodiment, the user terminal 100 may include a communication interface 110, a microphone 120, a speaker 130, a display 140, a memory 150, and/or a processor 160. The listed components may be operatively or electrically coupled to each other.

The communication interface 110 in an embodiment may be connected with an external device and configured to transmit and receive data. The microphone 120 in an embodiment may receive and convert a sound (e.g., a user utterance) into an electrical signal. The speaker 130 in an embodiment may output the electrical signal as a sound (e.g., a voice). The display 140 in an embodiment may be configured to display an image or a video. The display 140 in an embodiment may also display a graphic user interface (GUI) of an app (or an application program) which is run.

The memory 150 in an embodiment may store a client module 151, a software development kit (SDK) 153, and a plurality of apps. The client module 151 and the SDK 153 may make up a framework (or a solution program) for performing a universal function. Furthermore, the client module 151 or the SDK 153 may make up a framework for processing a voice input.

The plurality of apps may be programs for performing specified functions. According to an embodiment, the plurality of apps may include a first app 155_1 and/or a second app 155_3. According to an embodiment, each of the plurality of apps may include a plurality of actions for performing the specified function. For example, the apps may include an alarm app, a message app, and/or a schedule app. According to an embodiment, the plurality of apps may be run by the processor 160 to sequentially execute at least some of the plurality of actions.

The processor 160 in an embodiment may control the overall operation of the user terminal 100. For example, the processor 160 may be electrically coupled to the communication interface 110, the microphone 120, the speaker 130, and the display 140 to perform the specified operation. For example, the processor 160 may include at least one processor.

The processor 160 in an embodiment may also run a program stored in the memory 150 to perform the specified function. For example, the processor 160 may execute at least one of the client module 151 or the SDK 153 to perform the following operation for processing a voice input. The processor 160 may control, for example, actions of the plurality of apps by means of the SDK 153. The following operations described as the operation of the client module 151 or the SDK 153 may be operations performed by the execution of the processor 160.

The client module 151 in an embodiment may receive a voice input. For example, the client module 151 may receive a voice signal corresponding to a user utterance detected through the microphone 120. The client module 151 may transmit the received voice input (e.g., the voice signal) to the intelligent server 200. The client module 151 may transmit state information of the user terminal 100 to the intelligent server 200 together with the received voice input. The state information may be, for example, running state information of an app.

The client module 151 in an embodiment may receive a result corresponding to the received voice input. For example, when it is able for the intelligent server 200 to calculate the result corresponding to the received voice input, the client module 151 may receive the result corresponding to the received voice input. The client module 151 may display the received result on the display 140.

The client module 151 in an embodiment may receive a plan corresponding to the received voice input. The client module 151 may display the results of executing a plurality of actions of the app depending on the plan on the display 140. The client module 151 may sequentially display, for example, the results of executing the plurality of actions on the display 140. The user terminal 100 may display, for another example, some of the results of executing the plurality of actions (e.g., the result of a last action) on the display 140.

According to an embodiment, the client module 151 may receive a request for obtaining information for calculating a result corresponding to the voice input from the intelligent server 200. According to an embodiment, the client module 151 may transmit the information to the intelligent server 200 in response to the request.

The client module 151 in an embodiment may transmit information about the results of executing the plurality of actions depending on the plane to the intelligent server 200. The intelligent server 200 may identify that the received voice input is correctly processed using the result information.

The client module 151 in an embodiment may include a speed recognition module. According to an embodiment, the client module 151 may recognize a voice input of performing a limited function by means of the speed recognition module. For example, the client module 151 may run an intelligent app for processing a specified voice input (e.g., wake-up!) by performing an organic operation in response to the voice input.

The intelligent server 200 in an embodiment may receive information associated with a user voice input from the user terminal 100 over a communication network. According to an embodiment, the intelligent server 200 may change data associated with the received voice input to text data. According to an embodiment, the intelligent server 200 may generate at least one plan for performing a task corresponding to the user voice input based on the text data.

According to an embodiment, the plan may be generated by an artificial intelligent (AI) system. The AI system may be a rule-based system and may be a neural network-based system (e.g., a feedforward neural network (FNN) and/or a recurrent neural network (RNN)). Alternatively, the AI system may be a combination of those described above or an AI system different from the above. According to an embodiment, the plane may be selected from a set of predefined planes or may be generated in real time in response to a user request. For example, the AI system may select at least one of a plurality of predefined plans.

The intelligent server 200 in an embodiment may transmit a result according to the generated plan to the user terminal 100 or may transmit the generated plan to the user terminal 100. According to an embodiment, the user terminal 100 may display the result according to the plan on the display 140. According to an embodiment, the user terminal 100 may display the result of executing an action according to the plan on the display 140.

The intelligent server 200 in an embodiment may include a front end 210, a natural language platform 220, a capsule database 230, an execution engine 240, an end user interface 250, a management platform 260, a big data platform 270, and/or an analytic platform 280.

The front end 210 in an embodiment may receive a voice input received from the user terminal 100. The front end 210 may transmit a response corresponding to the voice input to the user terminal 100.

According to an embodiment, the natural language platform 220 may include an automatic speech recognition (ASR) module 221, a natural language understanding (NLU) module 223, a planner module 225, a natural language generator (NLG) module 227, and/or a text to speech (TTS) module 229.

The ASR module 221 in an embodiment may convert the voice input received from the user terminal 100 into text data. The NLU module 223 in an embodiment may identify an intention of a user using the text data of the voice input. For example, the NLU module 223 may perform syntactic analyze or semantic analyze to identify the intention of the user. The NLU module 223 in an embodiment may identify a meaning of a word extracted from the voice input using a linguistic feature (e.g., a syntactic element) of a morpheme or phrase and may match the identified meaning of the word with the intention to determine the intention of the user.

The planner module 225 in an embodiment may generate a plan using the intention determined by the NLU module 223 and a parameter. According to an embodiment, the planner module 225 may determine a plurality of domains for performing a task based on the determined intention. The planner module 225 may determine a plurality of actions included in each of the plurality of domains determined based on the intention. According to an embodiment, the planner module 225 may determine a parameter for executing the plurality of determined actions or a result value output by the execution of the plurality of actions. The parameter and the result value may be defined as the concept of a specified format (or class). Thus, the plan may include a plurality of actions determined by the intention of the user and/or a plurality of concepts. The planner module 225 may stepwise (or hierarchically) determine a relationship between the plurality of actions and the plurality of concepts. For example, the planner module 225 may determine an order where the plurality of actions determined based on the intention of the user are executed, based on the plurality of concepts. In other words, the planner module 225 may determine an order where the plurality of actions are executed, based on the parameter for executing the plurality of actions and the result output by the execution of the plurality of actions. Thus, the planner module 225 may generate a plan including related information (e.g., ontology) between the plurality of actions and the plurality of concepts. The planner module 225 may generate a plan using information stored in the capsule database 230 which stores a set of relationships between the concepts and the actions.

The NLG module 227 in an embodiment may change specified information to a text form. The information changed to the text form may be in the form of natural language utterance. The TTS module 229 in an embodiment may change the information in the form of text to information in the form of a voice.

According to an embodiment, some or all of the functions of the natural language platform 220 may also be implemented by the user terminal 100.

The capsule database 230 may store information a relationship between the plurality of concepts and actions corresponding to the plurality of domains. The capsule according to an embodiment may include a plurality of action objects (or action information) and conception objects (or concept information) included in the plan. According to an embodiment, the capsule database 230 may store a plurality of capsules in the form of a concept action network. According to an embodiment, the plurality of capsules may be stored in a function registry included in the capsule database 230.

The capsule database 230 may include a strategy registry which stores strategy information for determining the plane corresponding to the voice input. When there are a plurality of plans corresponding to the voice input, the strategy information may include reference information for determining one plan. According to an embodiment, the capsule database 230 may include a follow up registry which stores follow-up information for proposing a follow-up to the user in a specified situation. The follow-up may include, for example, a follow-up utterance. According to an embodiment, the capsule database 230 may include a layout registry which stores layout information of information output through the user terminal 100. According to an embodiment, the capsule database 230 may include a vocabulary registry which stores vocabulary information included in the capsule information. According to an embodiment, the capsule database 230 may include a dialog registry which stores information about dialog (or interaction) with the user. The capsule database 230 may update an object stored by means of a developer tool. The developer tool may include, for example, a function editor for updating an action object or a concept object. The developer tool may include a vocabulary editor for updating a vocabulary. The developer tool may include a strategy editor for generating and registers a strategy which determines a plan. The developer tool may include a dialog editor for generating a dialog with the user. The developer tool may include a follow up editor capable of activating a follow-up goal and editing a follow-up utterance which provides a hint. The follow-up goal may be determined based on a currently set goal, a preference of the user, or an environmental condition. In an embodiment, the capsule database 230 may also be implemented in the user terminal 100.

The execution engine 240 in an embodiment may calculate a result using the generated plan. The end user interface 250 may transmit the calculated result to the user terminal 100. Thus, the user terminal 100 may receive the result and may provide the user with the received result. The management platform 260 in an embodiment may manage information used in the intelligent server 200. The big data platform 270 in an embodiment may collect data of the user. The analytic platform 280 in an embodiment may manage quality of service (QoS) of the intelligent server 200. For example, the analytic platform 280 may manage a component and a processing speed (or efficiency) of the intelligent server 200.

The service server 300 in an embodiment may provide the user terminal 100 with a specified service (e.g., food ordering or hotel reservation). According to an embodiment, the service server 300 may be a server operated by a third party. The service server 300 in an embodiment may provide the intelligent server 200 with information for generating a plan corresponding to the received voice input. The provided information may be stored in the capsule database 230. Furthermore, the service server 300 may provide the intelligent server 200 with result information according to the plan. For example, the service server 300 may include a plurality of servers (e.g., a first service server 301, a second service server 303, and/or a third service server 305).

In the integrated intelligence system described above, the user terminal 100 may provide the user with various intelligent services in response to the user input. The user input may include, for example, an input by means of a physical button, a touch input, or a voice input.

In an embodiment, the user terminal 100 may provide the speech recognition service by means of an intelligent app (or a speed recognition app) stored therein. In this case, for example, the user terminal 100 may recognize a user utterance or a voice input received through the microphone 120 and may provide the user with a service corresponding to the recognized voice input.

In an embodiment, the user terminal 100 may perform a specified action independently or together with the intelligent server 200 and/or the service server 300, based on the received voice input. For example, the user terminal 100 may run an app corresponding to the received voice input and may perform the specified action by means of the run app.

In an embodiment, when the user terminal 100 provides the service together with the intelligent server 200 and/or the service server 300, it may detect a user utterance using the microphone 120 and may generate a signal (or voice data) corresponding to the detected user utterance. The user terminal 100 may transmit the voice data to the intelligent server 200 using the communication interface 110.

The intelligent server 200 according to an embodiment may generate a plan for performing a task corresponding to the voice input or a result of performing an action depending on the plane, as a response to the received voice input. The plane may include, for example, a plurality of actions for performing the task corresponding to the voice input of the user and/or a plurality of concepts associated with the plurality of actions. The concept may be to define a parameter input in the execution of the plurality of actions or a result value output by the execution of the plurality of actions. The plane may include related information between the plurality of actions and/or the plurality of concepts.

The user terminal 100 in an embodiment may receive the response using the communication interface 110. The user terminal 100 may output a voice signal generated in the user terminal 100 to the outside using the speaker 130 or may output an image generated in the user terminal 100 to the outside using the display 140.

Figure 2:
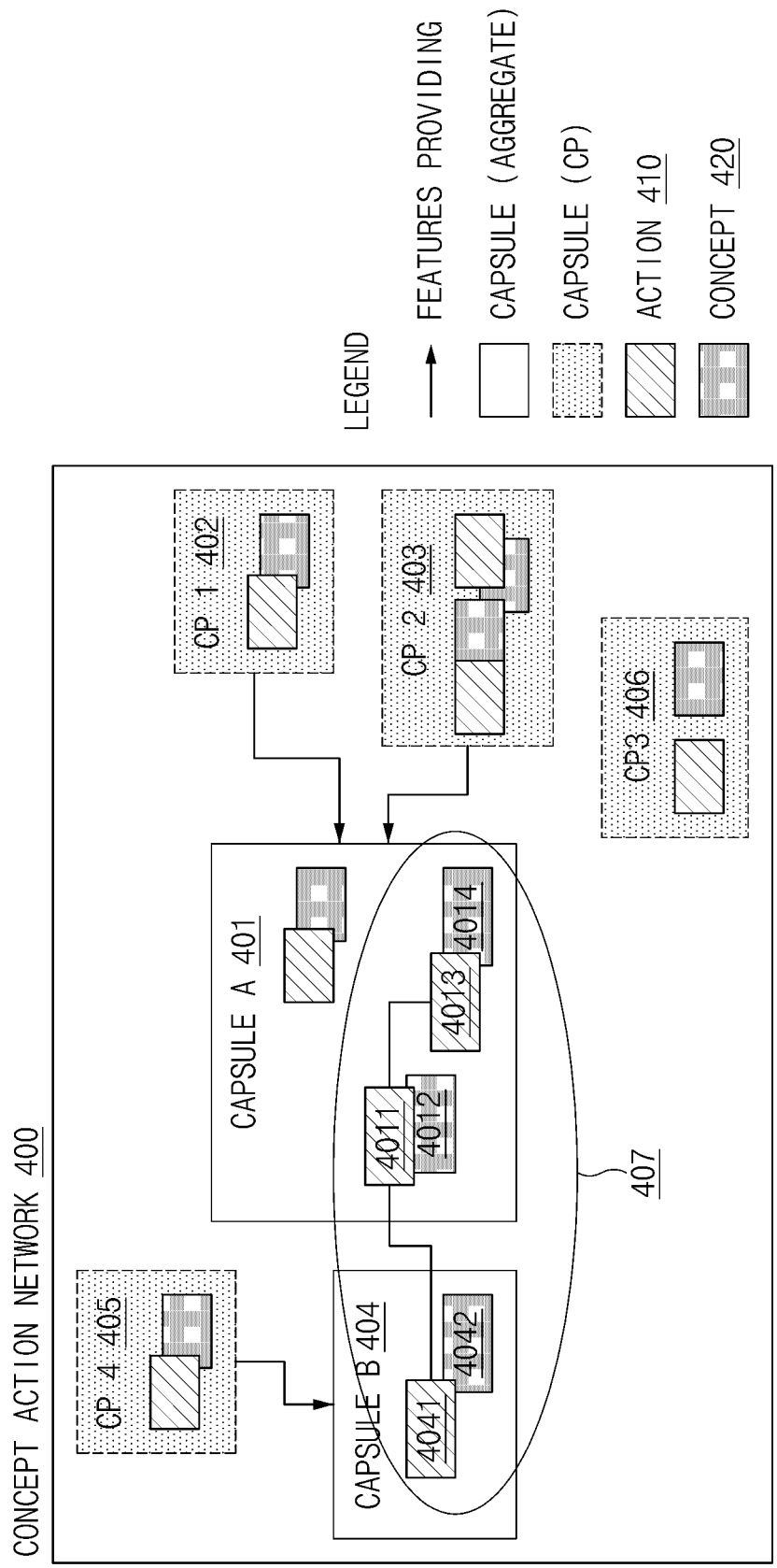
FIG. 2 is a drawing illustrating a form where relationship information between a conception and an action is stored in a database, according to an embodiment.

FIG. 2 is a drawing illustrating a form where relationship information between a conception and an action is stored in a database, according to an embodiment.

A capsule database (e.g., a capsule database 230) of an intelligent server 200 may store a capsule in the form of a concept action network (CAN). The capsule database may store an action for processing a task corresponding to a voice input of a user and a parameter for the action in the form of the concept action network (CAN).

The capsule database may store a plurality of capsules (capsule A 401 and capsule B 404) respectively corresponding to a plurality of domains (e.g., applications). According to an embodiment, one capsule (e.g., capsule A 401) may correspond to one domain (e.g., a location (geo) or an application). Furthermore, at least one service provider (CP 1 402 or CP 2 403) for performing a function of a domain associated with the capsule may correspond to one capsule. According to an embodiment, one capsule may include at least one or more actions 410 for performing a specified function and at least one concepts 420.

A natural language platform 220 may generate a plan for performing a task corresponding to the received voice input using a capsule stored in a capsule database 230. For example, a planner module 225 of the natural language platform 220 may generate a plan using the capsule stored in the capsule database. For example, the planner module 225 may generate a plan 407 using actions 4011 and 4013 and concepts 4012 and 4014 of capsule A 401 and an action 4041 and a concept 4042 of capsule B 404.

Figure 3:
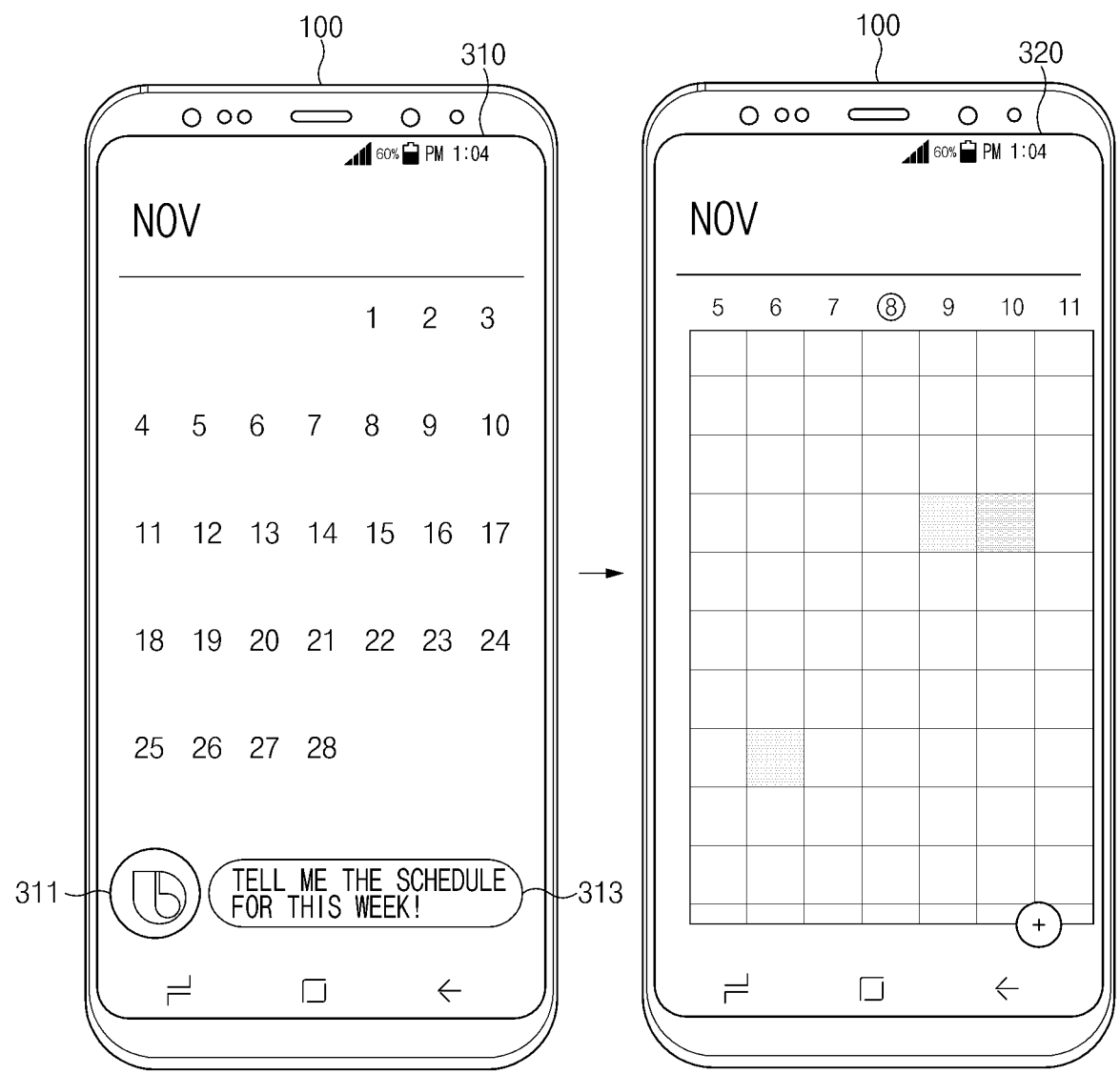
FIG. 3 is a drawing illustrating a user terminal which displays a screen for processing a voice input received through an intelligent app, according an embodiment.

FIG. 3 is a drawing illustrating a screen where a user terminal processes a voice input received through an intelligent app according certain embodiments.

A user terminal 100 may run an intelligent app to process a user input by means of an intelligent server 200.

According to an embodiment, on screen 310, the user terminal 100 may recognize a specified voice input (e.g., wake-up!) or may run the intelligent app for processing the voice input, when receiving an input by means of a hardware key (e.g., a dedicated hardware key). The user terminal 100 may run, for example, the intelligent app in a state where a schedule app is run. According to an embodiment, the user terminal 100 may display an object (e.g., an icon) 311 corresponding to the intelligent app on a display 140. According to an embodiment, the user terminal 100 may receive a voice input by a user utterance. For example, the user terminal 100 may receive the voice input, "Tell me the schedule for this week!". According to an embodiment, the user terminal 100 may display a user interface (UI) 313 (e.g., an input window) of the intelligent app, on which text data of the received voice input is displayed, on the display 140.

According to an embodiment, on screen 320, the user terminal 100 may display a result corresponding to the received voice input on the display 140. For example, the user terminal 100 may receive a plan corresponding to the received user input and may display a "schedule for this week" on the display 140 depending on the plan.

Figure 4:
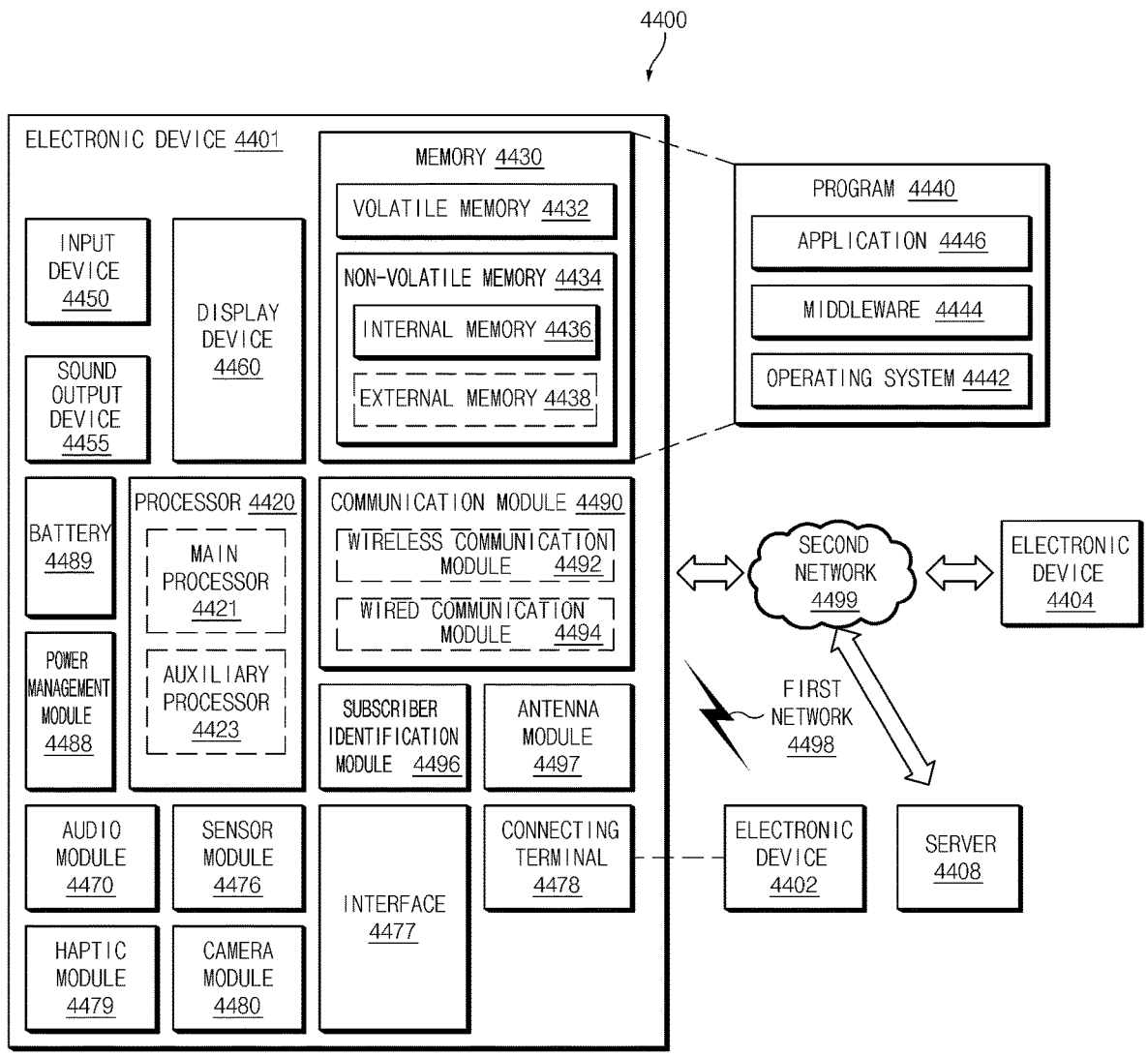
FIG. 4 is a block diagram illustrating an electronic device in a network environment, according to certain embodiments.

FIG. 4 is a block diagram illustrating an electronic device 4401 in a network environment 4400 according to certain embodiments. Referring to FIG. 4, the electronic device 4401 in the network environment 4400 may communicate with an electronic device 4402 via a first network 4498 (e.g., a short-range wireless communication network), or an electronic device 4404 or a server 4408 via a second network 4499 (e.g., a long-range wireless communication network). According to an embodiment, the electronic device 4401 may communicate with the electronic device 4404 via the server 4408. According to an embodiment, the electronic device 4401 may include a processor 4420, memory 4430, an input device 4450, a sound output device 4455, a display device 4460, an audio module 4470, a sensor module 4476, an interface 4477, a haptic module 4479, a camera module 4480, a power management module 4488, a battery 4489, a communication module 4490, a subscriber identification module (SIM) 4496, or an antenna module 4497. In some embodiments, at least one (e.g., the display device 4460 or the camera module 4480) of the components may be omitted from the electronic device 4401, or one or more other components may be added in the electronic device 4401. In some embodiments, some of the components may be implemented as single integrated circuitry. For example, the sensor module 4476 (e.g., a fingerprint sensor, an iris sensor, or an illuminance sensor) may be implemented as embedded in the display device 4460 (e.g., a display).

The processor 4420 may execute, for example, software (e.g., a program 4440) to control at least one other component (e.g., a hardware or software component) of the electronic device 4401 coupled with the processor 4420, and may perform various data processing or computation. According to an embodiment, as at least part of the data processing or computation, the processor 4420 may load a command or data received from another component (e.g., the sensor module 4476 or the communication module 4490) in volatile memory 4432, process the command or the data stored in the volatile memory 4432, and store resulting data in non-volatile memory 4434. According to an embodiment, the processor 4420 may include a main processor 4421 (e.g., a central processing unit (CPU) or an application processor (AP)), and an auxiliary processor 4423 (e.g., a graphics processing unit (GPU), an image signal processor (ISP), a sensor hub processor, or a communication processor (CP)) that is operable independently from, or in conjunction with, the main processor 4421. Additionally or alternatively, the auxiliary processor 4423 may be adapted to consume less power than the main processor 4421, or to be specific to a specified function. The auxiliary processor 4423 may be implemented as separate from, or as part of the main processor 4421.

The auxiliary processor 4423 may control at least some of functions or states related to at least one component (e.g., the display device 4460, the sensor module 4476, or the communication module 4490) among the components of the electronic device 4401, instead of the main processor 4421 while the main processor 4421 is in an inactive (e.g., sleep) state, or together with the main processor 4421 while the main processor 4421 is in an active state (e.g., executing an application). According to an embodiment, the auxiliary processor 4423 (e.g., an image signal processor or a communication processor) may be implemented as part of another component (e.g., the camera module 4480 or the communication module 4490) functionally related to the auxiliary processor 4423.

The memory 4430 may store various data used by at least one component (e.g., the processor 4420 or the sensor module 4476) of the electronic device 4401. The various data may include, for example, software (e.g., the program 4440) and input data or output data for a command related thereto. The memory 4430 may include the volatile memory 4432 or the non-volatile memory 4434.

The program 4440 may be stored in the memory 4430 as software, and may include, for example, an operating system (OS) 4442, middleware 4444, or an application 4446.

The input device 4450 may receive a command or data to be used by other component (e.g., the processor 4420) of the electronic device 4401, from the outside (e.g., a user) of the electronic device 4401. The input device 4450 may include, for example, a microphone, a mouse, a keyboard, or a digital pen (e.g., a stylus pen).

The sound output device 4455 may output sound signals to the outside of the electronic device 4401. The sound output device 4455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 4460 may visually provide information to the outside (e.g., a user) of the electronic device 4401. The display device 4460 may include, for example, a display, a hologram device, or a projector and control circuitry to control a corresponding one of the display, hologram device, and projector. According to an embodiment, the display device 4460 may include touch circuitry adapted to detect a touch, or sensor circuitry (e.g., a pressure sensor) adapted to measure the intensity of force incurred by the touch.

The audio module 4470 may convert a sound into an electrical signal and vice versa. According to an embodiment, the audio module 4470 may obtain the sound via the input device 4450, or output the sound via the sound output device 4455 or a headphone of an external electronic device (e.g., an electronic device 4402) directly (e.g., wiredly) or wirelessly coupled with the electronic device 4401.

The sensor module 4476 may detect an operational state (e.g., power or temperature) of the electronic device 4401 or an environmental state (e.g., a state of a user) external to the electronic device 4401, and then generate an electrical signal or data value corresponding to the detected state. According to an embodiment, the sensor module 4476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 4477 may support one or more specified protocols to be used for the electronic device 4401 to be coupled with the external electronic device (e.g., the electronic device 4402) directly (e.g., wiredly) or wirelessly. According to an embodiment, the interface 4477 may include, for example, a high definition multimedia interface (HDMI), a universal serial bus (USB) interface, a secure digital (SD) card interface, or an audio interface.

A connecting terminal 4478 may include a connector via which the electronic device 4401 may be physically connected with the external electronic device (e.g., the electronic device 4402). According to an embodiment, the connecting terminal 4478 may include, for example, a HDMI connector, a USB connector, a SD card connector, or an audio connector (e.g., a headphone connector).

The haptic module 4479 may convert an electrical signal into a mechanical stimulus (e.g., a vibration or a movement) or electrical stimulus which may be recognized by a user via his tactile sensation or kinesthetic sensation. According to an embodiment, the haptic module 4479 may include, for example, a motor, a piezoelectric element, or an electric stimulator.

The camera module 4480 may capture a still image or moving images.

According to an embodiment, the camera module 4480 may include one or more lenses, image sensors, image signal processors, or flashes.

The power management module 4488 may manage power supplied to the electronic device 4401. According to an embodiment, the power management module 4488 may be implemented as at least part of, for example, a power management integrated circuit (PMIC).

The battery 4489 may supply power to at least one component of the electronic device 4401. According to an embodiment, the battery 4489 may include, for example, a primary cell which is not rechargeable, a secondary cell which is rechargeable, or a fuel cell.

The communication module 4490 may support establishing a direct (e.g., wired) communication channel or a wireless communication channel between the electronic device 4401 and the external electronic device (e.g., the electronic device 4402, the electronic device 4404, or the server 4408) and performing communication via the established communication channel. The communication module 4490 may include one or more communication processors that are operable independently from the processor 4420 (e.g., the application processor (AP)) and supports a direct (e.g., wired) communication or a wireless communication. According to an embodiment, the communication module 4490 may include a wireless communication module 4492 (e.g., a cellular communication module, a short-range wireless communication module, or a global navigation satellite system (GNSS) communication module) or a wired communication module 4494 (e.g., a local area network (LAN) communication module or a power line communication (PLC) module). A corresponding one of these communication modules may communicate with the external electronic device via the first network 4498 (e.g., a short-range communication network, such as Bluetooth™ wireless-fidelity (Wi-Fi) direct, or infrared data association (IrDA)) or the second network 4499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 4492 may identify and authenticate the electronic device 4401 in a communication network, such as the first network 4498 or the second network 4499, using subscriber information (e.g., international mobile subscriber identity (IMSI)) stored in the subscriber identification module 4496.

The antenna module 4497 may transmit or receive a signal or power to or from the outside (e.g., the external electronic device) of the electronic device 4401. According to an embodiment, the antenna module 4497 may include an antenna including a radiating element implemented using a conductive material or a conductive pattern formed in or on a substrate (e.g., PCB). According to an embodiment, the antenna module 4497 may include a plurality of antennas. In such a case, at least one antenna appropriate for a communication scheme used in the communication network, such as the first network 4498 or the second network 4499, may be selected, for example, by the communication module 4490 (e.g., the wireless communication module 4492) from the plurality of antennas. The signal or the power may then be transmitted or received between the communication module 4490 and the external electronic device via the selected at least one antenna. According to an embodiment, another component (e.g., a radio frequency integrated circuit (RFIC)) other than the radiating element may be additionally formed as part of the antenna module 4497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 4401 and the external electronic device 4404 via the server 4408 coupled with the second network 4499. Each of the electronic devices 4402 and 4404 may be a device of a same type as, or a different type, from the electronic device 4401. According to an embodiment, all or some of operations to be executed at the electronic device 4401 may be executed at one or more of the external electronic devices 4402, 4404, or 4408. For example, if the electronic device 4401 should perform a function or a service automatically, or in response to a request from a user or another device, the electronic device 4401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 4401. The electronic device 4401 may provide the outcome, with or without further processing of the outcome, as at least part of a reply to the request. To that end, a cloud computing, distributed computing, or client-server computing technology may be used, for example.

In an embodiment, the user terminal 100 of FIGS. 1, 2, and 3 may correspond to the electronic device 4401. In an embodiment, an intelligent server 200 of FIG. 1 may correspond to any one of the electronic device 4404 and the server 4408. In an embodiment, a processor 160 of FIG. 1 may correspond to the processor 4420, and a display 140 of FIG. 1 may correspond to the display device 4460, and a speaker 130 of FIG. 1 may correspond to the sound output device 4455.

Figure 5:
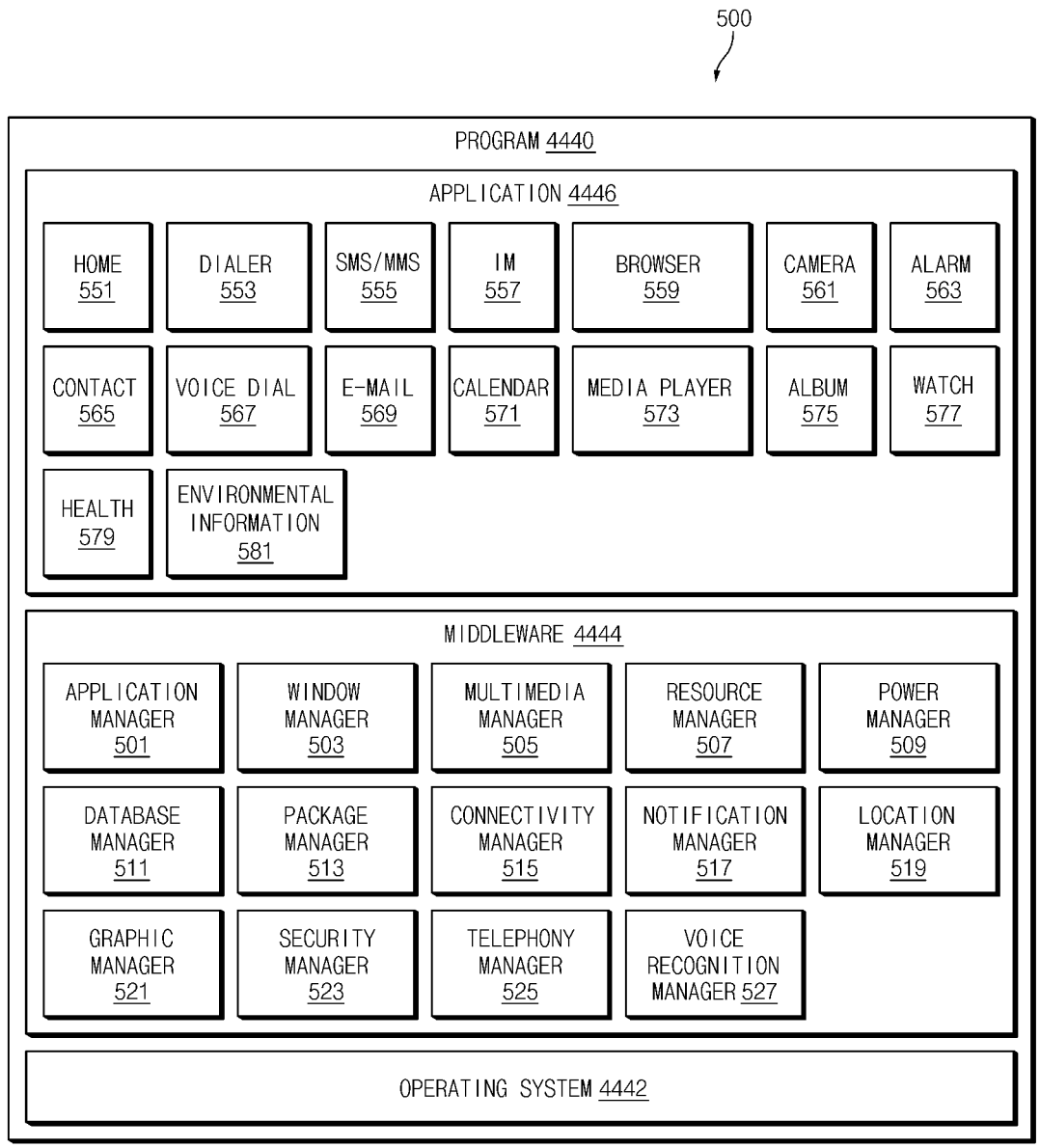
FIG. 5 is a block diagram illustrating a program according to certain embodiments.

FIG. 5 is a block diagram 500 illustrating the program 4440 according to certain embodiments. According to an embodiment, the program 4440 may include an operating system (OS) 4442 to control one or more resources of the electronic device 4401, middleware 4444, or an application 4446 executable in the OS 4442. The OS 4442 may include, for example, Android™, iOS™, Windows™, Symbian, Tizen™, or Bada™. At least part of the program 4440, for example, may be pre-loaded on the electronic device 4401 during manufacture, or may be downloaded from or updated by an external electronic device (e.g., the electronic device 4402 or 4404, or the server 4408) during use by a user.

The OS 4442 may control management (e.g., allocating or deallocation) of one or more system resources (e.g., process, memory, or power source) of the electronic device 4401. The OS 4442, additionally or alternatively, may include one or more driver programs to drive other hardware devices of the electronic device 4401, for example, the input device 4450, the sound output device 4455, the display device 4460, the audio module 4470, the sensor module 4476, the interface 4477, the haptic module 4479, the camera module 4480, the power management module 4488, the battery 4489, the communication module 4490, the subscriber identification module 4496, or the antenna module 4497.

The middleware 4444 may provide various functions to the application 4446 such that a function or information provided from one or more resources of the electronic device 4401 may be used by the application 4446. The middleware 4444 may include, for example, an application manager 501, a window manager 503, a multimedia manager 505, a resource manager 507, a power manager 509, a database manager 511, a package manager 513, a connectivity manager 515, a notification manager 517, a location manager 519, a graphic manager 521, a security manager 523, a telephony manager 525, or a voice recognition manager 527.

The application manager 501, for example, may manage the life cycle of the application 4446. The window manager 503, for example, may manage one or more graphical user interface (GUI) resources that are used on a screen. The multimedia manager 505, for example, may identify one or more formats to be used to play media files, and may encode or decode a corresponding one of the media files using a codec appropriate for a corresponding format selected from the one or more formats. The resource manager 507, for example, may manage the source code of the application 4446 or a memory space of the memory 4430. The power manager 509, for example, may manage the capacity, temperature, or power of the battery 4489, and determine or provide related information to be used for the operation of the electronic device 4401 based at least in part on corresponding information of the capacity, temperature, or power of the battery 4489. According to an embodiment, the power manager 509 may interwork with a basic input/output system (BIOS) (not shown) of the electronic device 4401.

The database manager 511, for example, may generate, search, or change a database to be used by the application 4446. The package manager 513, for example, may manage installation or update of an application that is distributed in the form of a package file. The connectivity manager 515, for example, may manage a wireless connection or a direct connection between the electronic device 4401 and the external electronic device. The notification manager 517, for example, may provide a function to notify a user of an occurrence of a specified event (e.g., an incoming call, message, or alert). The location manager 519, for example, may manage locational information on the electronic device 4401. The graphic manager 521, for example, may manage one or more graphic effects to be offered to a user or a user interface related to the one or more graphic effects.

The security manager 523, for example, may provide system security or user authentication. The telephony manager 525, for example, may manage a voice call function or a video call function provided by the electronic device 4401. The voice recognition manager 527, for example, may transmit a user's voice data to the server 4408, and receive, from the server 4408, a command corresponding to a function to be executed on the electronic device 4401 based at least in part on the voice data, or text data converted based at least in part on the voice data. According to an embodiment, the middleware 4444 may dynamically delete some existing components or add new components. According to an embodiment, at least part of the middleware 4444 may be included as part of the OS 4442 or may be implemented as another software separate from the OS 4442.

The application 4446 may include, for example, a home 551, dialer 553, short message service (SMS)/multimedia messaging service (MMS) 555, instant message (IM) 557, browser 559, camera 561, alarm 563, contact 565, voice recognition 567, email 569, calendar 571, media player 573, album 575, watch 577, health 579 (e.g., for measuring the degree of workout or biometric information, such as blood sugar), or environmental information 581 (e.g., for measuring air pressure, humidity, or temperature information) application. According to an embodiment, the application 4446 may further include an information exchanging application (not shown) that is capable of supporting information exchange between the electronic device 4401 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 569) of the electronic device 4401 to the external electronic device. Additionally or alternatively, the notification relay application may receive notification information from the external electronic device and provide the notification information to a user of the electronic device 4401.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 6:
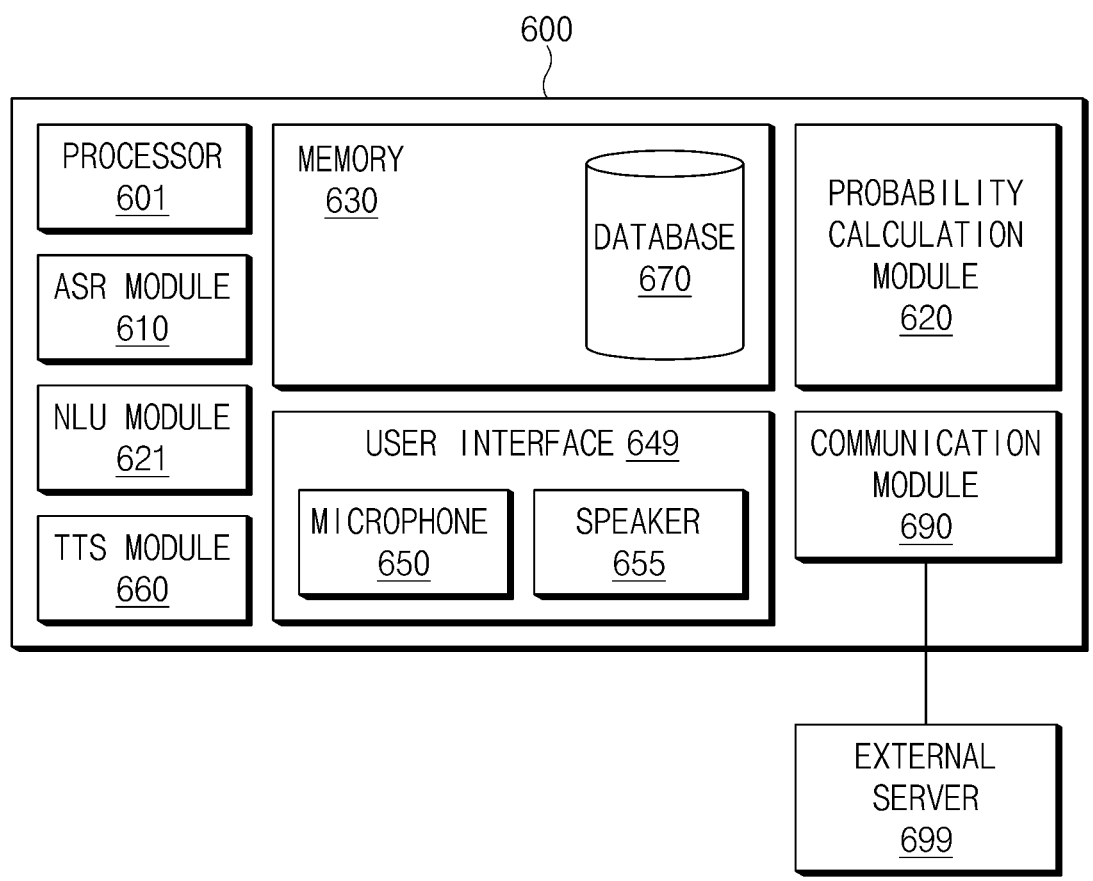
FIG. 6 is a block diagram illustrating a structure of an electronic device according to an embodiment disclosed in the disclosure.

FIG. 6 is a block diagram illustrating a structure of an electronic device 600 according to an embodiment disclosed in the disclosure. For clarity of description, those being duplicated with those described above may be simplified or omitted.

Referring to FIG. 6, an electronic device 600 may include a processor 601 (e.g., a processor 160 of FIG. 1 and/or a processor 4420 of FIG. 4), a memory 630 (e.g., a memory 4430 of FIG. 4), a database 670, a user interface 649, and a communication module 690 (e.g., a communication module 4490 of FIG. 4). The user interface 649 may include a microphone 650 (e.g., a microphone 120 of FIG. 1 and/or an input device 4450 of FIG. 4) and a speaker 655 (e.g., a speaker 130 of FIG. 1 and/or a sound output device 4455 of FIG. 4).

The electronic device 600 may also include an ASR module 610 (e.g., an ASR module 221 of FIG. 1), an NLU module 621 (e.g., an NLU module 223 of FIG. 1), a TTS module 660 (e.g., a TTS module 229 of FIG. 1) and a probability calculation module 620.

The electronic device 600 may further include at least one additional component other than the components shown in FIG. 6. According to an embodiment, the components of the electronic device 600 may make up the same entity or separate entities.

The electronic device 600 may include, for example, a smart phone, a tablet, a wearable device, a home appliance, or a digital camera.

According to an embodiment, the processor 601 may be operatively coupled to the communication module 690, the memory 630, and the user interface 649 (the microphone 650 and the speaker 655) to perform the overall function of the electronic device 600. The processor 601 may include, for example, one or more processors. The one or more processors may include, for example, an image signal processor (ISP), an application processor (AP), or a communication processor (CP).

Furthermore, the processor 601 may execute instructions stored in the memory 630 and may drive the ASR module 610, the NLU module 621, the probability calculation module 620, and the TTS module 660.

The processor 601 may be coupled to the ASR module 610, the NLU module 621, the probability calculation module 620, the TTS module 660 to perform the overall function of the electronic device 600. In an embodiment disclosed in the disclosure, the operation performed (or executed) by the ASR module 610, the NLU module 621, the probability calculation module 620, or the TTS module 660 may be understood as an operation performed as the processor 601 executes instructions stored in the memory 630.

Several modules described in certain embodiments of the disclosure may be implemented in hardware and may be implemented in software.

The memory 630 may store a database 670 including at least one input data. It is shown in FIG. 6 that the database 670 is implemented in the memory, but this is illustrative, but not limited thereto. For example, a database may be implemented outside the electronic device 600.

The memory 630 may store commands, information or data associated with operations of the components included in the electronic device 600. For example, the memory 630 may store instructions, when executed, causing the processor 601 to perform various operations described in the disclosure. In an embodiment, unlike that shown in FIG. 6, the processor 601 may include the ASR module 610, the NLU module 621, the probability calculation module 620, and the TTS module 660. In this case, the operation performed (or executed) by each of the ASR module 610, the NLU module 621, the probability calculation module 620, and the TTS module 660 may be implemented as at least a part of the processor 601.

In an embodiment, the electronic device 600 may receive a user input using the user interface 649. The user input may be an input including a user voice input (e.g., a wake-up word).

In an embodiment, the user input may be a voice input (e.g., an utterance) of the user. When the user input is the voice input, the electronic device 600 may receive the user input through the microphone (or a voice receiver) 650.

According to an embodiment, the processor 601 may include an acoustic module (not shown) for executing the user input.

The acoustic module may recognize a user input for executing an operation. For example, the acoustic module may recognize and receive the voice signal (e.g., the wake-up word). The acoustic module which recognizes the user input may be strong against, for example, surrounding noise to enhance a speed recognition rate.

According to an embodiment, the acoustic module may be learned to recognize and receive a user input using an algorithm for recognizing a voice. The algorithm used to recognize the voice may be at least one of, for example, a hidden Markov model (HMM) algorithm, an artificial neural network (ANN) algorithm, and a dynamic time warping (DTW) algorithm. The ASR module 610 may convert the received user input into text data. The probability calculation module 620 may calculate a probability value according to a magnitude of a signal noise ratio (hereinafter referred to as "SNR") value of each execution candidate device, with respect to each of execution candidate devices which receive a voice signal of the user.

In an embodiment, the probability calculation module 620 may calculate a probability value according to an SNR magnitude based on a relative coordinate difference (distance) between the execution candidate device derived according to the SNR magnitude and the user.

The probability calculation module 620 may calculate a probability value according to a usage frequency of each execution candidate device.

In an embodiment, the probability calculation module 620 may calculate a probability value according to a usage frequency of each execution candidate device based on a device usage pattern according to past input details of the user.

The probability calculation module 620 may calculate a final probability value using the probability value according to the usage frequency and the probability value according to the SNR magnitude.

In an embodiment, the probability calculation module 620 may perform calculation (e.g., various statistical calculation including four arithmetical operations, comparison operations, logical operations, a spectrum analysis, a correlation coefficient, dispersion, standard deviation calculation, and the like) using the probability value according to the usage frequency and the probability value according to the SNR magnitude and may calculate a final probability value depending on the calculated result.

In an embodiment, the probability calculation module 620 may store the calculated probability values of the respective execution candidate devices in the memory 630 (or the database 670 included in the memory 630). The probability calculation module 620 may calculate the final probability value using the probability values stored in the memory 630.

In an embodiment, the electronic device 600 may store the probability values of the respective execution candidate devices, which are calculated by the probability calculation module 620, in the memory 630 (or the database 670 included in the memory 630).

In an embodiment, the probability calculation module 620 may be triggered by an event where a new device is recognized or added to perform the operation of storing the probability values of the respective execution candidate devices, which are calculated by the probability calculation module 620, in the memory 630 (or the database 670 included in the memory 630).

In an embodiment, a database (not shown) may be implemented outside the electronic device 600 rather than inside the electronic device 600. In an embodiment, the electronic device 600 may periodically store the probability values of the respective execution candidate devices, which are stored in the external database, in the memory 630 (or the database 670 included in the memory 630) from the external database.

The TTS module 660 may transform the response data in the form of text into voice data. The electronic device 600 (and/or the processor 601) may output the response data transformed into the voice data, through the speaker 655.

In an embodiment, at least one of the operations of the respective components described with reference to the electronic device 600 may be performed (or executed) by an external server 699 or another electronic device (not shown). For example, the processor 601 may transmit a user input to the external server 699 or the other electronic device (not shown), using the communication module 690.

A processor (not shown) included in the external server 699 or the other electronic device (not shown) may receive the user input and may generate response data to transmit the response data to the electronic device 600.

The processor 601 may receive the response data corresponding to the user input through the communication module 690 from the external server 699 or the other electronic device (not shown). When receiving the response data, the processor 601 may output the response data through the speaker 655. Alternatively, the processor 601 may control another device through the communication module 690 or may store data. The processor 601 may be configured with at least one or more processors and may be run by being physically divided into a main processor for performing high-performance processing and an auxiliary processor for performing low-power processing. Alternatively, one processor may perform processing by switching between high performance and low power depending on a situation.

Hereinafter, the operation of the processor 601 will be described in detail.

According to an embodiment, an electronic device 600 may include a communication circuit, a processor operatively coupled to the communication circuit, and a memory operatively coupled to the processor. The memory may store instructions, when executed, causing the processor to receive data including a probability value according to a usage frequency of at least one external device receiving a voice signal of a user and a probability value according to a signal noise ratio (SNR) magnitude of the at least one external device using the communication circuit, calculate a final probability value of the at least one external device based on the probability value according to the usage frequency of the at least one external device and the probability value according to the SNR magnitude of the at least one external device, and select an external device having the highest first final probability value as an execution device for the voice signal based on the final probability value.

According to an embodiment, the electronic device 600 may further include a voice receiver. The instructions may cause the processor to receive the voice signal of the user through the voice receiver, calculate a second final probability value of the electronic device using a probability value according to a usage frequency of the electronic device and a probability value according to an SNR magnitude of the electronic device, and compare the second final probability value of the electronic device with the first final probability value of the external electronic device to select a device having the highest final probability value as the execution device for the voice signal.

According to an embodiment, the electronic device 600 may further include at least one output device among a speaker or a display. The instructions may cause the processor to output a response to the voice signal through the at least one output device, when the electronic device is selected as the execution device.

According to an embodiment, the usage frequency may include a usage frequency using a voice command and a usage frequency using a manual manipulation. The probability value according to the usage frequency may include a probability value calculated based on a weight for each of the usage frequency using the voice command and the usage frequency using the manual manipulation.

According to an embodiment, the weight may be assigned based on a usage frequency of the user.

According to an embodiment, the processor of the electronic device 600 may include an acoustic module. The instructions may cause the processor to receive the voice signal using the acoustic module. The acoustic module may be learned using a learning algorithm.

According to an embodiment, the instructions of the electronic device 600 may cause the processor to normalize the SNR magnitude of the at least one external device to calculate the probability value according to the SNR magnitude.

According to an embodiment, the instructions of the electronic device 600 may cause the processor to calculate a distance from the user to the at least one external device using the SNR magnitude of the at least one external device and normalize the calculated distance using a maximum distance.

According to an embodiment, the instructions of the electronic device 600 may cause the processor to add the probability value according to the usage frequency to the probability value according to the SNR magnitude to calculate the final probability value.

According to an embodiment, the instructions of the electronic device 600 may cause the processor to receive the probability value according to the usage frequency of the at least one external device and the probability value according to the SNR magnitude of the at least one external device from the at least one external device through the communication circuit.

Hereinafter, a description will be given of a method for processing the user input in the electronic device 4401 according to an embodiment disclosed in the disclosure with reference to FIGS. 7 to 9.

Figure 7:
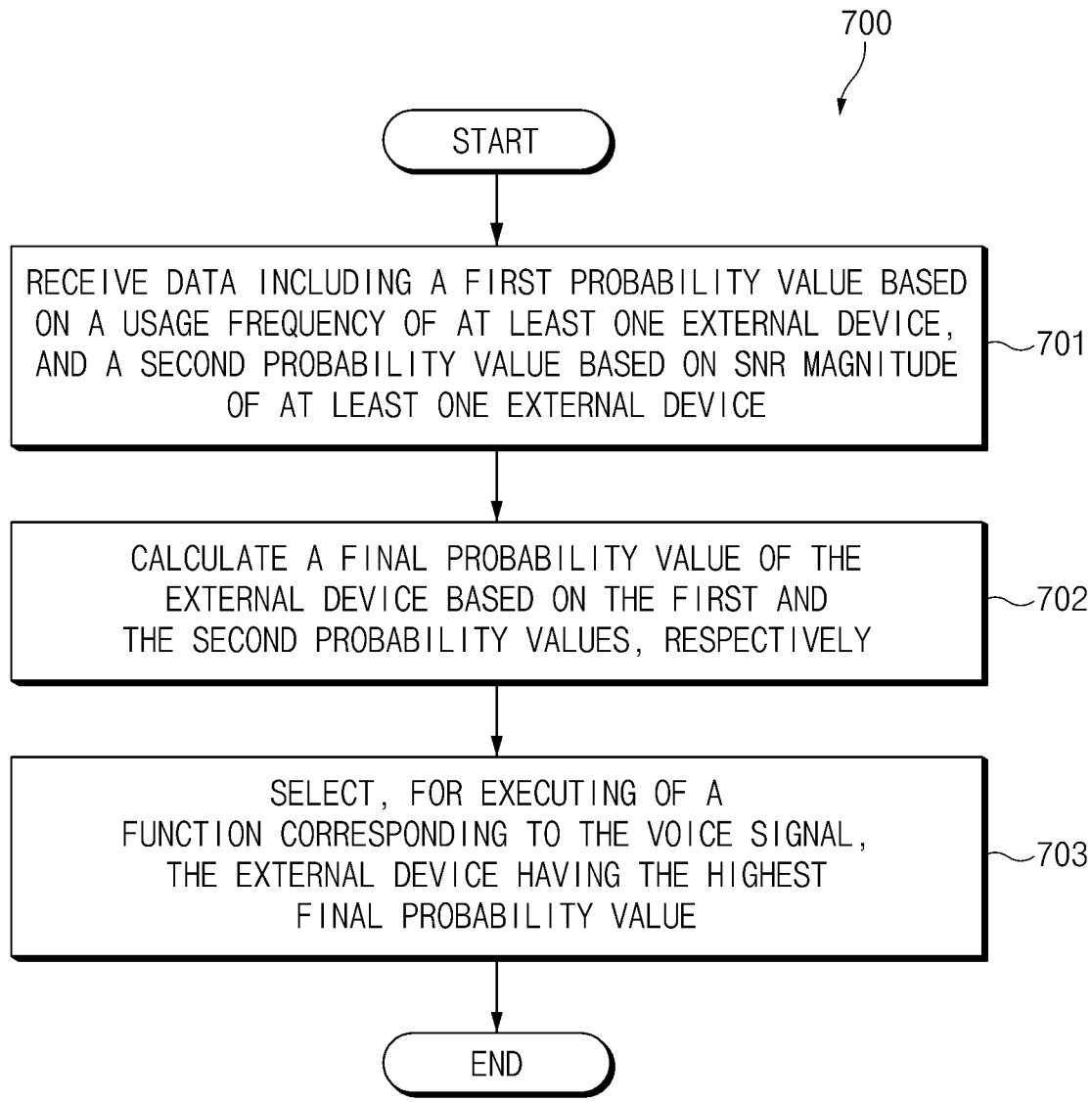
FIG. 7 is a flowchart of a method for processing a user input in an electronic device.

FIG. 7 is a flowchart 700 of a method for processing a user input in an electronic device 4401, according to an example embodiment. According to an example embodiment, a process shown in FIG. 7 may be understood as performed by executing instructions stored in a memory (e.g., a memory 4430 of FIG. 4) in a processor (e.g., a processor 4420 of FIG. 4) of an electronic device (e.g., an electronic device 4401 of FIG. 4).

In operation 701, the electronic device 4401 may receive data including a first probability value based on a usage frequency of at least one external device, and a second probability value based on a signal-noise-ratio (hereinafter referred to as "SNR") magnitude of the at least one external device. The at least one external device may include the execution device or devices which received the voice signal (or a "wake-up word") of a user. The usage frequency may indicate, for example, a usage frequency of voice command functions, and a usage frequency of manual inputs.

In an embodiment, the electronic device 4401 may compare an signal power intensity with a noise power intensity for each execution candidate device which received the user voice signal (or a wake-up word) to determine a relative signal power magnitude, which may be the SNR magnitude.

In operation 702, the electronic device 4401 may calculate a final probability value of the external device based on the first and second probability values based on the usage frequency and the SNR magnitude, respectively.

In an embodiment, the electronic device 4401 may perform calculation (e.g., various statistical calculation including four arithmetical operations, comparison operations, logical operations, a spectrum analysis, a correlation coefficient, dispersion, standard deviation calculation, and the like) using the probability values based upon the usage frequency and the SNR magnitude, and thus calculate a final probability value.

In an embodiment, the electronic device 4401 may calculate a probability value based on an SNR magnitude based on a relative coordinate difference (e.g., distance) between the execution candidate device derived according to the SNR magnitude and the user.

In an embodiment, the electronic device 4401 may calculate a probability value based on a usage frequency of each execution candidate device via a device usage pattern according to historical input patterns and behaviors of the user.

In operation 703, the electronic device 4401 may select, for execution of a function corresponding to the voice signal, the external device having the highest final probability value.

The device chosen to execute the function may be referred to as an "execution device," which thereby executes the operation for an additional input of the user after receiving the user voice signal (e.g., the wake-up word).

Figure 8:
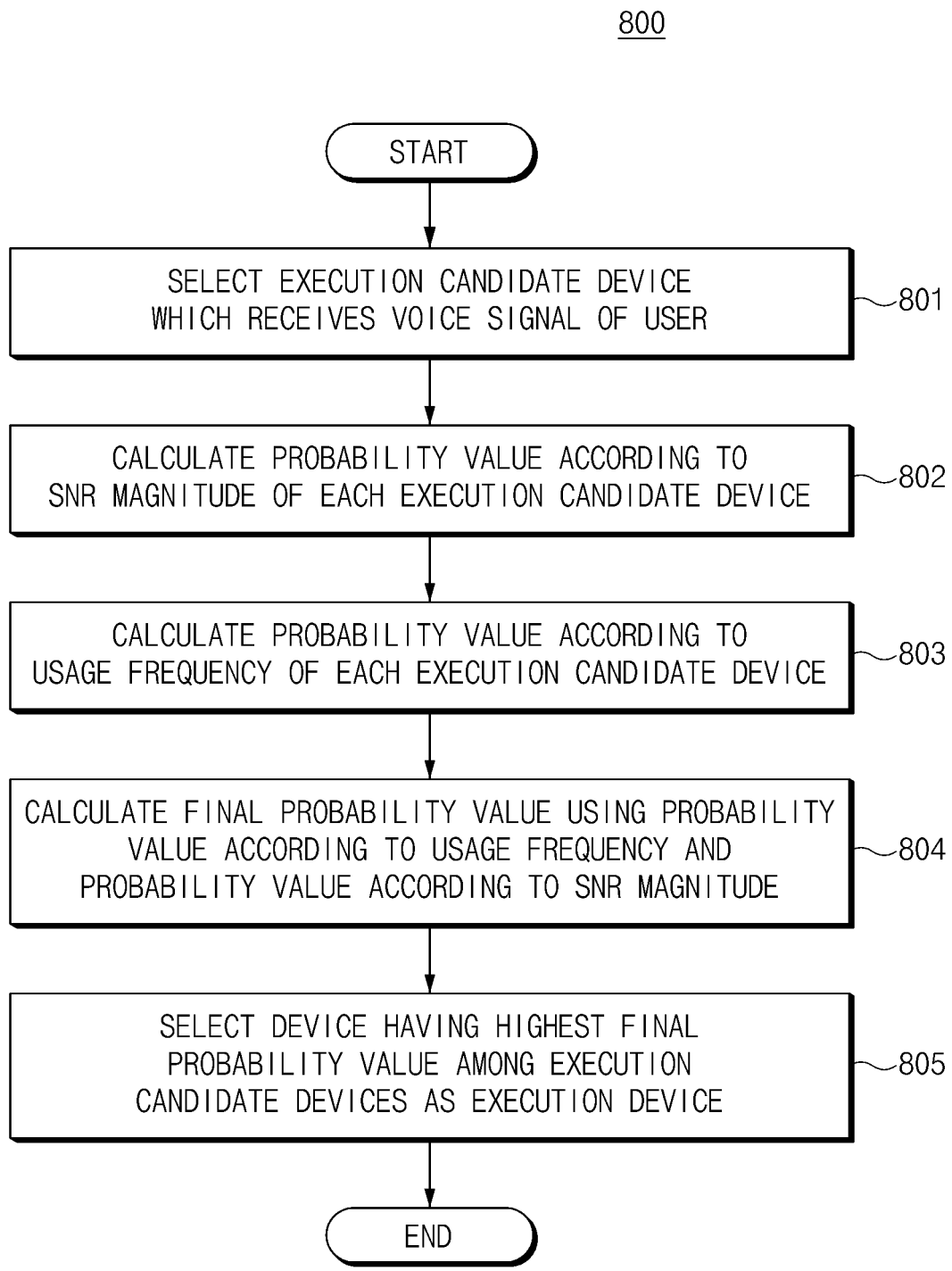
FIG. 8 is another flowchart of a method for processing a user input in an electronic device.

FIG. 8 is a flowchart 800 of a method for processing a user input in an electronic device 4401. According to an embodiment, a process shown in FIG. 8 may be understood as being performed by executing instructions stored in a memory (e.g., a memory 4430 of FIG. 4) in a processor (e.g., a processor 4420 of FIG. 4) of an electronic device (e.g., an electronic device 4401 of FIG. 4).

In operation 801, the electronic device 4401 may select one or more execution candidate devices, referring to the device or devices which have received a user voice signal.

The user voice signal may refer to a voice input (utterance) of a user for executing a speech recognition service loaded into the electronic device 4401. For example, the user voice signal may refer to a "wake-up" word utterance of the user triggering a voice command function (e.g., "Hi Bixby"). When a plurality of external electronic devices receive the user voice signal, the electronic device 4401 may select all of the plurality of external electronic devices as execution candidate devices. In an embodiment, the execution candidate devices may include thereon operative speech recognition services which are activatable by the same wake-up word, which here may correspond to the user voice signal (e.g., "Hi Bixby!").

In operation 802, the electronic device 4401 may calculate a probability value according to at least a signal-noise-ratio (again, a "SNR") magnitude of each execution candidate device. In an embodiment, the electronic device 4401 may compare a signal power intensity with a noise power intensity for each respective execution candidate device which received the user voice signal (e.g., the wake-up word), to indicate a relative signal power magnitude as an SNR magnitude.

In an embodiment, the electronic device 4401 may calculate a probability value according to an SNR magnitude based on a relative coordinate difference (distance) between the execution candidate device derived according to the SNR magnitude and the user.

In an embodiment, the electronic device 4401 may normalize SNR magnitudes of execution candidate devices. For example, the electronic device 4401 may normalize SNR magnitudes of the execution candidate devices based on a highest SNR magnitude value extant among the execution candidate devices. A description will be given in detail of it with reference to FIGS. 9 and 10.

In operation 803, the electronic device 4401 may calculate a probability value according to at least a usage frequency of each execution candidate device. The usage frequency may include a frequency by which the user generates voice commands and a usage by which the user enters manual inputs instead.

In an embodiment, the electronic device 4401 the usage frequency of each execution candidate device may be based on a device usage patterns as indicated by historical input records for the user in question.

In an embodiment, the electronic device 4401 may calculate a total usage frequency of each device, using the voice command usage frequency and the manual input usage frequency.

In an embodiment, the electronic device 4401 may normalize the calculated total usage frequency to calculate a probability value according to a usage frequency of each device.

For example, when the user uses most voice commands to manipulate a TV at a specific location, the TV may have a probability value according to the highest usage frequency with respect to a user voice signal input at the specific location. A description will be given in detail of it with reference to FIGS. 11 and 13.

It is shown in FIG. 8 that the electronic device sequentially performs operation 802 and operation 803, but this is illustrative. It is possible to change an order relationship between operation 802 and operation 803. For example, the electronic device may perform operation 802 and operation 803 in parallel. Alternatively, after performing operation 803, the electronic device may perform operation 802.

In operation 804, the electronic device 4401 may calculate a final probability value using the first probability value based upon usage frequency, and the second probability value based upon the SNR magnitude.

In an embodiment, the electronic device 4401 may perform calculation (e.g., various statistical calculation including four arithmetical operations, comparison operations, logical operations, a spectrum analysis, a correlation coefficient, dispersion, standard deviation calculation, and the like) using the first probability value based on the usage frequency and the second probability value based on the SNR magnitude and may calculate a final probability value.

In operation 805, the electronic device 4401 may select a device having the highest final probability value among the execution candidate devices as the execution device.

As noted previously, the execution device refers to the device chosen to execute an operation requesting additional input of the user after entering a voice control mode based on reception of the user voice signal (e.g., the wake-up word).

In an embodiment, the electronic device 4401 may cause the selected execution device to provide the user with response data using an output device of the execution device with respect to the user voice signal (e.g., the wake-up word). The response data may include a sound, an image, vibration, and/or the like.

Figure 9:
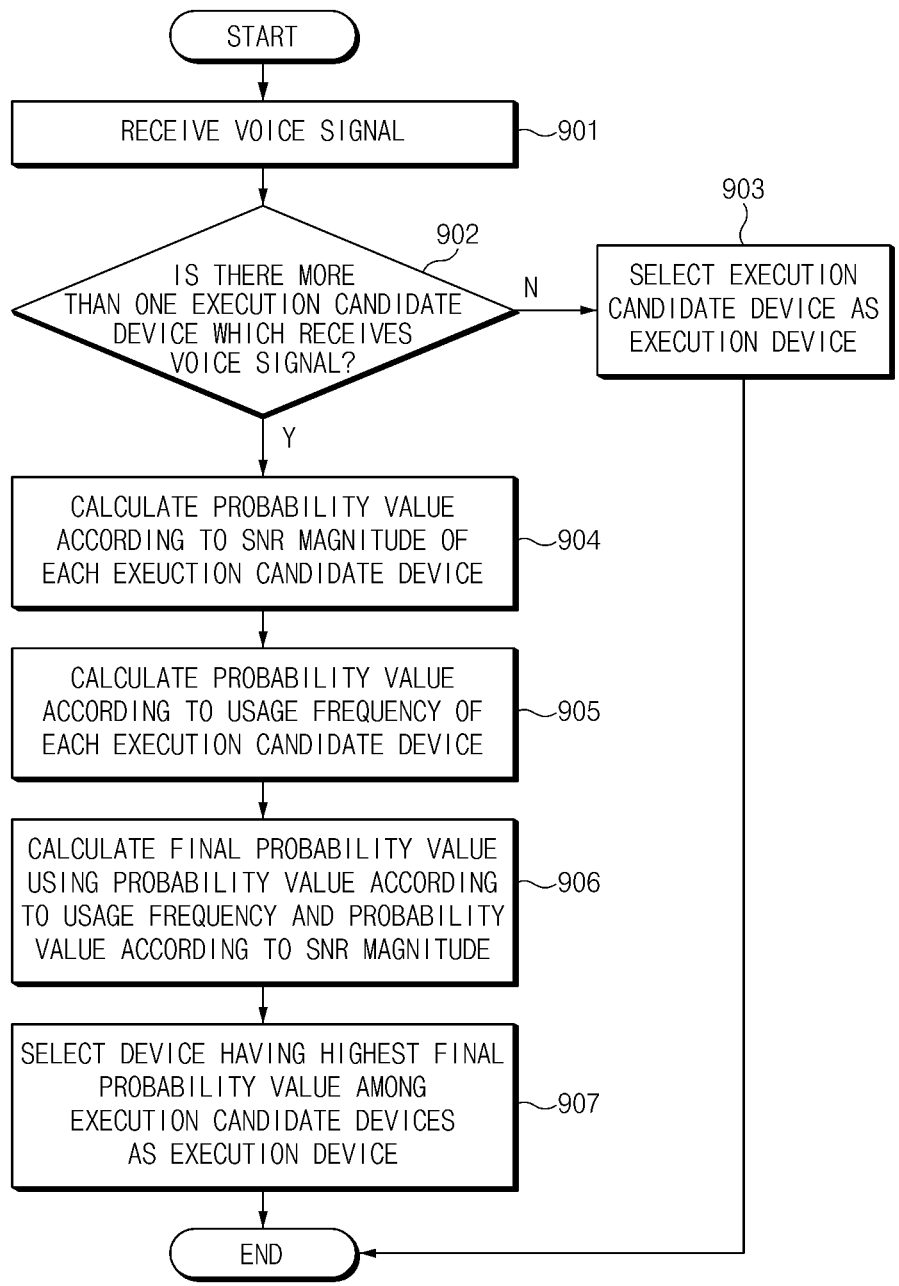
FIG. 9 is a flowchart of another method for processing a user input in an electronic device.

FIG. 9 is a flowchart 900 of another method for processing a user input in an electronic device 4401. According to an embodiment, a process shown in FIG. 9 may be understood as being performed by executing instructions stored in a memory (e.g., a memory 4430 of FIG. 4) in a processor (e.g., a processor 4420 of FIG. 4) of an electronic device (e.g., an electronic device 4401 of FIG. 4).

In operation 901, the electronic device 4401 may receive a voice signal of a user. The electronic device 4401 may receive a user input using a input circuitry (i.e., a "user interface" device 649). The user interface 649 may include, for example, a microphone, a speaker, and an input device.

In an embodiment, the electronic device 4401 may receive the user input through a microphone (or a voice receiver). The electronic device 4401 may identify input data matched with the received user input. For example, when the user input is a voice input (e.g., an utterance), the electronic device 4401 may convert the received user input into text data. The electronic device 4401 may determine whether a voice signal (e.g., a wake-up word) is included in the received user input using the converted data.

In operation 902, the electronic device 4401 may determine whether more than one device capable of responding to the voice signal has received the voice signal.

In an embodiment, the electronic device 4401 may receive data indicating reception of the voice signal from one or more surrounding external devices which are communicatively coupled to the electronic device 4401, via a communication circuit (e.g., a communication module 690 of FIG. 6) and may determine a count of the execution candidate devices.

When the execution candidate device is not plural in number, in operation 903, the electronic device 4401 may select the execution candidate device as an execution device.

On the other hand, when it is determined that there are two or more execution candidate devices, then in operation 904, the electronic device 4401 may calculate a probability value according to a signal-noise-ratio (hereinafter referred to as "SNR") magnitude of each execution candidate device. The electronic device 4401 may compare signal power intensity with a noise power intensity to determine a relative signal power magnitude as an SNR magnitude.

In an embodiment, the electronic device 4401 may calculate a probability value according to an SNR magnitude based on a relative coordinate difference (distance) between the execution candidate device derived according to the SNR magnitude and the user.

In an embodiment, the electronic device 4401 may normalize SNR magnitudes of execution candidate devices. For example, the electronic device 4401 may normalize SNR magnitudes of the execution candidate devices based on an SNR magnitude of an execution candidate device having the highest SNR magnitude among the execution candidate devices. A description will be given in detail of it with reference to FIGS. 10 and 11.

In operation 905, the electronic device 4401 may calculate a probability value according to respective usage frequencies of each execution candidate device. The usage frequency may include a usage frequency using a voice command and a usage frequency using a manual manipulation.

In an embodiment, the electronic device 4401 may calculate a probability value according to a usage frequency of each execution candidate device based on a device usage pattern according to past input details of the user.

In an embodiment, the electronic device 4401 may calculate a total usage frequency of each device using the usage frequency using the voice command and the usage frequency using the manual manipulation.

In an embodiment, the electronic device 4401 may normalize the calculated total usage frequency to calculate a probability value according to a usage frequency of each device. A description will be given in detail of it with reference to FIGS. 12 and 14.

It is shown in FIG. 9 that the electronic device sequentially performs operation 904 and operation 905, but this is illustrative. It is possible to change an order relationship between operation 904 and operation 905. For example, the electronic device may perform operation 904 and operation 905 in parallel. Alternatively, after performing operation 904, the electronic device may perform operation 905.

In operation 906, the electronic device 4401 may calculate a final probability value for each candidate device, using a respective first probability value based on the usage frequency for each device, and a respective second probability value based on the SNR magnitude for each device.

In an embodiment, the electronic device 4401 may perform calculation (e.g., various statistical calculation including four arithmetical operations, comparison operations, logical operations, a spectrum analysis, a correlation coefficient, dispersion, standard deviation calculation, and the like) using the probability value according to the usage frequency and the probability value according to the SNR magnitude and may calculate a final probability value according to the calculated result.

In operation 907, the electronic device 4401 may select a candidate device associated with a highest final probability value from among the execution candidate devices as the execution device.

As noted earlier, the execution device refers to a device which executes an operation prompting input of an additional input, after entering a voice command mode based on reception of the user voice signal (e.g., the wake-up word).

In an embodiment, the electronic device 4401 may cause the selected execution device to provide the user with response data (e.g., "Yes, go ahead") using an output device of the execution device with respect to the user voice signal (e.g., the wake-up word, for example, "Hi Bixby"). The response data may include a sound, an image, vibration, and/or the like. For example, when the electronic device 4401 is selected as the execution device, it may output response data to the voice signal using a TTS module, using a speaker. When the user additionally input (e.g., "turn on the TV") an operation to be performed by the execution device with respect to the response data, the electronic device 4401 may perform the operation (e.g., the operation of turning on the TV).

A method performed in an electronic device 4401 according to an embodiment may include receiving data including a probability value according to a usage frequency of at least one external device receiving a voice signal of a user and a probability value according to a signal noise ratio (SNR) magnitude of the at least one external device using a communication circuit included in the electronic device 4401, calculating a final probability value of the at least one external device based on the probability value according to the usage frequency of the at least one external device and the probability value according to the SNR magnitude of the at least one external device, and selecting an external device having the highest first final probability value as an execution device for the voice signal based on the final probability value.

The method performed in the electronic device 4401 according to an embodiment may further include receiving the voice signal of the user, calculating a second final probability value of the electronic device using a probability value according to a usage frequency of the electronic device and a probability value according to an SNR magnitude of the electronic device, and comparing the second final probability value of the electronic device with the first final probability value of the external electronic device to select a device having the highest final probability value as the execution device for the voice signal.

The method performed in the electronic device 4401 according to an embodiment may further include outputting a response to the voice signal through an output device included in the electronic device or operatively coupled to the electronic device, when the electronic device is selected as the execution device.

According to an embodiment, the usage frequency may include a usage frequency using a voice command and a usage frequency using a manual manipulation. The probability value according to the usage frequency may include a probability value calculated based on a weight for each of the usage frequency using the voice command and the usage frequency using the manual manipulation.

According to an embodiment, the weight may be assigned based on a usage frequency of the user.

The method performed in the electronic device 4401 according to an embodiment may further include receiving the voice signal using an acoustic module included in the electronic device or operatively coupled to the electronic device. The acoustic module may be learned using a learning algorithm.

The method performed in the electronic device 4401 according to an embodiment may further include normalizing the SNR magnitude of the at least one external device to calculate the probability value according to the SNR magnitude.

In the method performed in the electronic device 4401 according to an embodiment, the normalizing of the SNR magnitude of the at least one external device may include calculating a distance from the user to the at least one external device using the SNR magnitude of the at least one external device and normalizing the calculated distance using a maximum distance.

The method performed in the electronic device 4401 according to an embodiment may further include adding the probability value according to the usage frequency to the probability value according to the SNR magnitude to calculate the final probability value.

The method performed in the electronic device 4401 according to an embodiment may further include receiving the probability value according to the usage frequency of the at least one external device and the probability value according to the SNR magnitude of the at least one external device from the at least one external device through the communication circuit.

Hereinafter, a description will be given in detail of a method for processing a user input in the electronic device 4401 according to an embodiment with reference to the drawings illustrated in FIGS. 10 to 14. FIGS. 10 to 14 are drawings illustrating a method for selecting an execution device with respect to a user input in the electronic device 4401 according to an embodiment of the disclosure.

Figure 10:
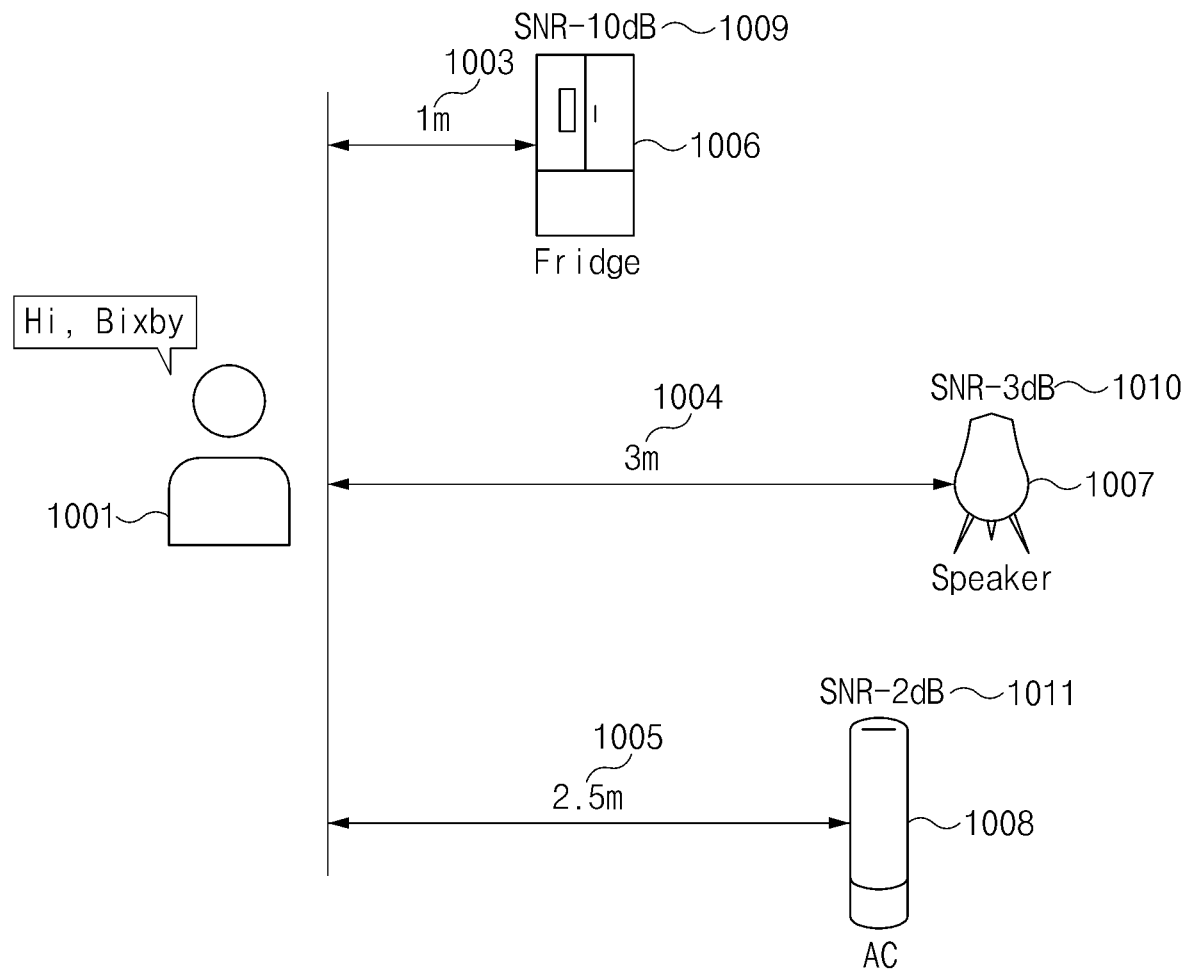
FIG. 10 is a drawing illustrating reception of a voice input by multiple electronic devices.

FIG. 10 is a drawing illustrating that one or more electronic devices receive a voice signal. The electronic device 4401 may select an execution candidate device which receives a voice signal of a user. The electronic device 4401 may be a device included in the execution candidate devices and may be a device independent of the execution candidate device.

Taking FIG. 10 as an example, when a user 1001 utters a wake-up word (e.g., "Hi, Bixby!") as a voice signal, a fridge 1006, a speaker 1007, and an AC 1008 may receive the voice signal. The electronic device 4401 may select the fridge 1006, the speaker 1007, and the AC 1008 as execution candidate devices. The electronic device 4401 may be one of the fridge 1006, the speaker 1007, or the AC 1008, or in other embodiments may be an external device separate from the candidate devices (not shown).

The respective electronic devices included in the execution candidate devices may be located at different distances 1003, 1004, and 1005 from the user 1001. In the example of FIG. 10, the fridge 1006 may be located 1 m 1003 away from a user 1001, the speaker 1007 may be located 3 m 1004 away from the user 1001, and the AC 1008 may be located 2.5 m 1005 away from the user 1001.

The electronic devices may measure SNR magnitudes 1009, 1010, and 1011, respectively. Taking FIG. 10 as an example, an SNR magnitude of the fridge 1006 located 1 m 1003 away from the user 1001 may be measured as −10 dB 1009. An SNR magnitude of the speaker 1007 located 3 m 1004 away from the user 1001 may be measured as −3 dB 310. An SNR magnitude of the AC 1008 located 2.5 m 1005 away from the user 1001 may be measured as −2 dB 1011.

The SNR magnitude may be determined by various environmental elements of each device as well as the distance. For example, a noise degree around the device, a performance degree of a microphone of the device, or the like may be included in the environmental elements.

Figure 11:
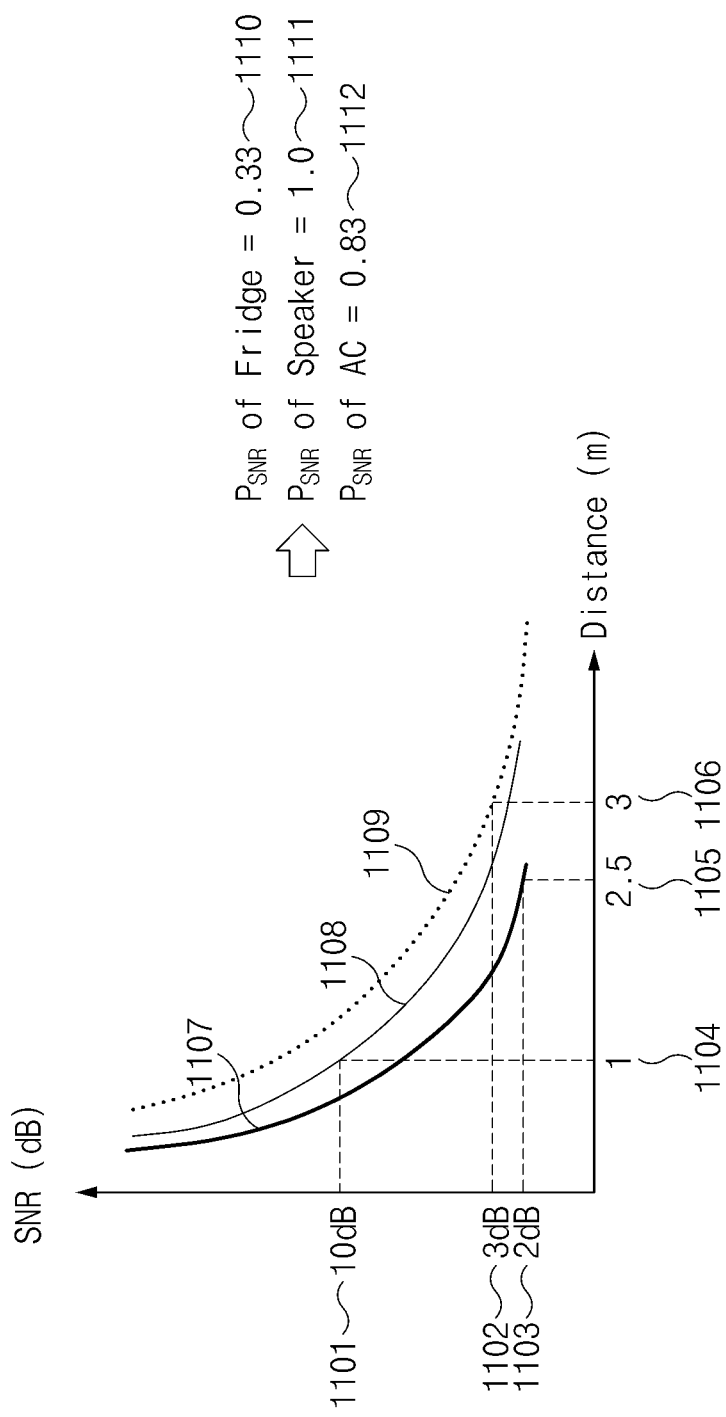
FIG. 11 is a drawing illustrating calculation of respective probability values according to an SNR magnitude of each execution candidate device.

FIG. 11 is a drawing illustrating calculations by an electronic device 4401 of a probability value according to an SNR magnitude. FIG. 11 illustrates an SNR-distance profile, based on characteristics of respective electronic devices, where the vertical axis is an SNR magnitude and the horizontal axis is a distance.

The SNR magnitude used for the SNR-profile may refer to an absolute value of an SNR magnitude measured by each electronic device. Taking FIG. 11 as an example, the SNR magnitude used for the SNR-distance profile for an SNR magnitude of a fridge 1006, which is measured as −10 dB 1009 in FIG. 10, may be 10 dB 1101. Likewise, the SNR magnitude used for the SNR-distance profile of a speaker 1007, which is measured as −3 dB 310, may be 3 dB 1102. The SNR magnitude used for the SNR-distance profile of an AC 1008, which is measured as −2 dB 1011, may be 2 dB 1103.

In an embodiment, the electronic device 4401 may calculate a distance based on each profile for a separate SNR magnitude measured by each device. Taking FIG. 11 as an example, in case of the fridge 1006 where the SNR magnitude used for the SNR-distance profile is 10 dB 1101, the electronic device 4401 may calculate a distance value as 1 m 1104 based on the profile 1108 of the fridge 1006. In case of the speaker 1007 where the SNR magnitude used for the SNR-distance profile is 3 dB 1102, the electronic device 4401 may calculate a distance value as 3 m 1106 based on the profile 1109 of the speaker 1007. In case of the AC 1008 where the SNR magnitude used for the SNR-distance profile is 2 dB 1103, the electronic device 4401 may calculate a distance value as 2.5 m 1105 based on the profile 1107 of the AC 1008.

In an embodiment, the electronic device 4401 may normalize a distance calculated by each device using a maximum distance value and may calculate a probability value for an SNR magnitude of each execution candidate device. Taking FIG. 11 as an example, the electronic device 4401 may calculate a probability value for the SNR magnitude of the fridge as 0.33 1110, may calculate a probability value for the SNR magnitude of the speaker as 1.0 1111, and may calculate a probability value for the SNR magnitude of the AC as 0.83 1112.

Figure 12:
FIG. 12 is a drawing illustrating calculation of respective probability values according to a usage frequency of each execution candidate device.

FIG. 12 is a drawing illustrating that calculation of probability values by an electronic device 4401 according to a usage frequency.

In an embodiment, the electronic device 4401 may calculate a voice command usage frequency 1204 for each candidate device. Taking FIG. 12 as an example, the electronic device 4401 may respectively calculate voice command usage frequencies 1204 as values 15, 20, and 6 with respect to a fridge 1201, a speaker 1202, and an AC 1203.

In an embodiment, the electronic device 4401 may calculate a manual input (or manipulation) usage frequency 1205. The manual manipulation refers to manual user inputs using a remote controls, direct selection of buttons, switches, usage of touch inputs, etc. Taking FIG. 12 as an example, the electronic device 4401 may respectively calculate manual input usage frequencies 1205 as values 3, 10, and 40 with respect to the fridge 1201, the speaker 1202, and the AC 1203.

In an embodiment, the electronic device 4401 may calculate a total usage frequency of each device using the usage frequency 1204 using the voice command and the usage frequency 1205 using the manual manipulation. Taking FIG. 12 as an example, the electronic device 4401 may respectively calculate total usage frequencies 1206 as 18, 30, and 46 with respect to the fridge 1201, the speaker 1202, and the AC 1203. In FIG. 12, the calculation of adding the usage frequency 1204 using the voice input and the usage frequency 1205 using the manual manipulation is used as the scheme of calculating the total usage frequency 1206. This is illustrative, and various calculation methods may be used as the calculation of the total usage frequency. For example, various statistical calculation methods including four arithmetical operations, comparison operations, logical operations, a spectrum analysis, a correlation coefficient, dispersion, standard deviation calculation, and the like may be included in the calculation methods.

In an embodiment, the electronic device 4401 may normalize the calculated total usage frequency 1206 to calculate a probability value 1207 according to a usage frequency of each device. Taking FIG. 12 as an example, the electronic device 4401 may normalize a usage frequency 1206 of each of the fridge 1201, the speaker 1202, and the AC 1203 to respectively calculate probability values 1207 according to the usage frequencies of the respective devices as 0.39, 0.62, and 1.

Figure 13:
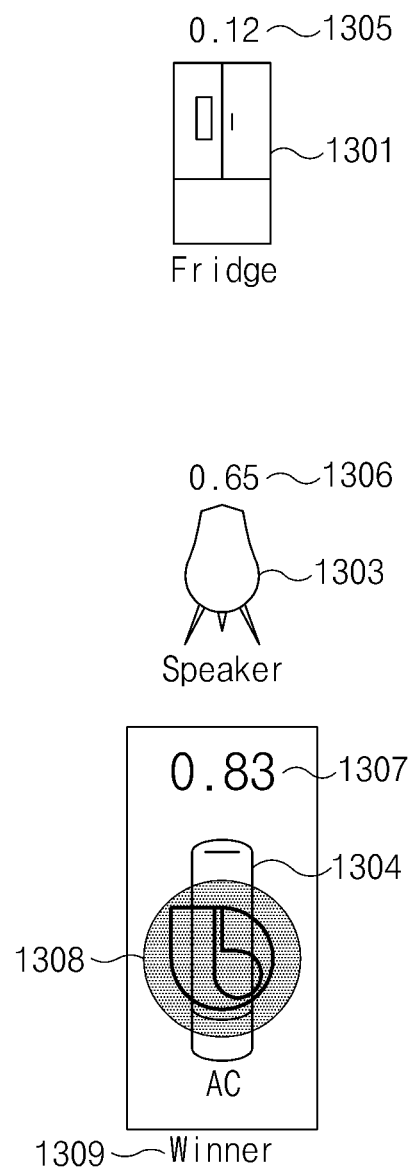
FIG. 13 is a drawing illustrating selection of a candidate device for execution.

FIG. 13 is a drawing illustrating selection of a candidate electronic device by an electronic device 4401. FIG. 13 illustrates a selection when the final probability values 1305, 1306, or 1307 of each of execution candidate devices 1301, 1303, and 1304, and display of icons 1308 and 1309 for selection of a candidate device having the highest final probability value 1307.

In an embodiment, the electronic device 4401 may calculate a final probability value using a probability value according to an SNR magnitude and a probability value according to a usage frequency. In the example of FIG. 13, the electronic device 4401 may respectively calculate final probability values 1305, 1306, and 1307 for the execution candidate devices 1301, 1303, and 1304 using the probability value according to the SNR magnitude, which was calculated in FIG. 11, and the probability value according to the usage frequency, which was calculated in FIG. 12. For example, the electronic device 4401 may calculate a final probability value in a manner which multiplies the probability value according to the SNR magnitude of each of the fridge 1301, the speaker 1303, and the AC 1304 by the probability value according to the usage frequency of each of the fridge 1301, the speaker 1303, and the AC 1304. The electronic device 4401 may obtain final probability values of 0.12 1305, 0.65 1306, and 0.83 1307 for the fridge 1301, the speaker 1303, and the AC 1304, respectively.

In an embodiment, the electronic device 4401 may select, as the execution device, a device having the highest final probability value from among the execution candidate devices 1301, 1303, and 1304. Taking FIG. 13 as an example, the electronic device 4401 may select the AC 1304 as the AC 1304 has the highest value of 0.83 1307 among the values 0.12 1305, 0.65 1306, and 0.83 1307, which are the final probability values of the respective execution candidate devices.

In an embodiment, the electronic device 4401 may display the execution candidate devices 1301, 1303, and 1304 and the final probability values 1305, 1306, and 1307 of the respective execution candidate devices using an output device, and display the icons 1308 and 1309 indicating the execution device having the highest final probability value. As seen in FIG. 13, the electronic device 4401 may display the fridge 1301, the speaker 1303, and the AC 1304, which are execution candidate devices, as icons using its display and may display 0.12 1305, 0.65 1306, and 0.83 1307 which are the final probability values overlapping respectively with the icons of the respective execution candidate devices. For example, the electronic device 4401 may display the final probability value 1307 to be larger than the final probability values 1305 and 1306 of the other devices with respect to the AC 1304, to indicate its selection as the execution device. The electronic device 4401 may display the icons 1308 and 1309 overlapping with the AC device 1304 icon, indicating its selection as the execution device, allowing for intuitive identification of the same by the user.

FIG. 14 is another drawing illustrating that an electronic device 4401 calculates a probability value according to a usage frequency of each execution candidate device. FIG. 14 is a drawing illustrating that the electronic device 4401 assigns a weight to each of a usage frequency using a voice command and a usage frequency using a manual manipulation and calculates a probability value according to the usage frequency of each execution candidate device.

In an embodiment, the electronic device 4401 may calculate a usage frequency 1404 using a voice command with respect to each device. Taking FIG. 14 as an example, the electronic device 4401 may respectively calculate usage frequencies 1404 using the voice command as 15, 20, and 6 for a fridge 1401, a speaker 1402, and an AC 1403.

In an embodiment, the electronic device 4401 may calculate a manual input usage frequency 1406. The manual manipulation may refer to a device manipulation by a user input using a remote control, a mechanical input, or a touch input, etc. Taking FIG. 14 as an example, the electronic device 4401 may respectively calculate usage frequencies 1406 using the manual manipulation as values 3, 10, and 40 with respect to the fridge 1401, the speaker 1402, and the AC 1403.

In an embodiment, the electronic device 4401 may assign different weights to the voice command usage frequency 1404 and the manual manipulation usage frequency 1406, and may calculate a total usage frequency 1408 of each device using the result value of applying the weights. Taking FIG. 14 as an example, the electronic device 4401 may respectively calculate total usage frequencies 1408 as values 11.4, 17, and 16.2 with respect to the fridge 1401, the speaker 1402, and the AC 1403.

In FIG. 14, the calculation of multiplying the voice command usage frequency 1404 and the manual manipulation usage frequency 1406 by assigned weights 1405 and 1407, and adding the values by which the weights are multiplied is used so as to generate the values of the total usage frequency 1408. This is, however, merely illustrative. Similar to being described with reference to FIG. 12, various calculation methods may be used as the calculation of the total usage frequency. For example, various statistical calculation methods including four arithmetical operations, comparison operations, logical operations, a spectrum analysis, a correlation coefficient, dispersion, standard deviation calculation, and the like may be included in the calculation methods.

In an embodiment, the electronic device 4401 may normalize the calculated total usage frequency 1408 to generate a probability value 1409 according to a usage frequency of each device. Taking FIG. 14 as an example, the electronic device 4401 may normalize a usage frequency 1408 of each of the fridge 1401, the speaker 1402, and the AC 1403 to respectively calculate probability values 1409 according to the usage frequencies of the respective devices as 0.67, 1.0, and 0.95.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 4440) including one or more instructions that are stored in a storage medium (e.g., internal memory 4436 or external memory 4438) that is readable by a machine (e.g., the electronic device 4401). For example, a processor (e.g., the processor 4420) of the machine (e.g., the electronic device 4401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
    a display;
    a communication circuit;
    a processor operatively coupled to the communication circuit; and
    a memory operatively coupled to the processor,
    wherein the memory stores instructions that are executable by the processor to
    cause the electronic device to:
    receive, from a plurality of external devices receiving a voice signal of a user, via the communication circuit, a first probability value based on usage frequency, and a second probability value based on signal-to-noise (SNR) magnitude;
    calculate final probability values for each of the plurality of external devices, based on the first and second probability values of each of the plurality of external devices;
    select an external device from among the plurality of external devices having a highest final probability value from among the calculated final probability values,
    display the plurality of external devices and the final probability values for each of the plurality of external devices via the display, wherein the highest final probability value for the selected external device is displayed larger than the final probability value of the others, and
    display an icon indicating that the external device is selected.

2. The electronic device of claim 1, further comprising:
    a voice receiver, wherein the voice signal is received via the voice receiver,
    wherein the instructions are further executable by the processor to:
    calculate for the electronic device a final probability value based on usage frequency of the electronic device and a SNR magnitude of the electronic device, and
    compare at least the final probability value for the electronic device to the final probability value for the selected external device to select a device having the highest final probability value, for executing a function corresponding to the received voice signal.

3. The electronic device of claim 2, further comprising:
    at least one output device,
    wherein the instructions are further executable by the processor to:
    output a response to the voice signal through the at least one output device, when the electronic device is selected as the execution device, based on the comparison.

4. The electronic device of claim 1, wherein each usage frequency indicates a frequency of voice command usage for the each of the plurality of electronic devices, and a frequency of manual input usage for the each of the plurality of electronic devices, and
  wherein the first probability value is calculated based on a weight generated using the frequency of voice command usage and the frequency of manual input usage.

5. The electronic device of claim 4, wherein the weight is assigned based on a usage frequency of the user.

6. The electronic device of claim 1, wherein the processor includes an acoustic module configured to implement machine learning using a learning algorithm, and
  wherein the instructions are further executable by the processor to:
  process the voice signal via the acoustic module.

7. The electronic device of claim 1, wherein calculating the first probability values for each of the plurality of external devices includes normalizing the SNR magnitude of each of the plurality of external devices.

8. The electronic device of claim 7, wherein the instructions are further executable by the processor to:
  calculate a distance from the user to each of the plurality of external devices using the SNR magnitude of the each of the plurality of external devices; and
  normalize the calculated distance using a prestored maximum distance value.

9. The electronic device of claim 1, wherein calculating the final probability values for the each of the plurality of external devices includes adding a first and the second probability values for the each of the plurality of external devices.

10. A method in an electronic device, the method comprising:
  receiving, from each of plurality of external devices receiving a voice signal of a user, via a communication circuit, a first probability value based on usage frequency, and a second probability value based on signal-to-noise (SNR) magnitude;
  calculating, via a processor, final probability values for each of the plurality of external devices, based on the first and second probability values of each of plurality of external devices; and
  selecting, via the processor, an external device from among the plurality of external devices having a highest final probability value from among the calculated final probability values,
  displaying the plurality of external devices and the final probability values for each of the plurality of external devices, wherein the highest final probability value for the selected external device is displayed larger than the final probability value of the others, and
  displaying an icon indicating that the external device is selected.

11. The method of claim 10,
wherein the method further comprises:
calculating for the electronic device a final probability value based on usage frequency of the electronic device and a SNR magnitude of the electronic device, and
comparing at least the final probability value for the electronic device to the final probability value for the selected external device to select a device having the highest final probability value, for executing a function corresponding to the received voice signal.

12. The method of claim 10, wherein each usage frequency indicates a frequency of voice command usage for the each of the plurality of electronic device, and a frequency of manual input usage for the each of the plurality of electronic device, and
  wherein the first probability value is calculated based on a weight generated using the frequency of voice command usage and the frequency of manual input usage.

13. The method of claim 10, wherein calculating the first probability values for each of the plurality of external devices includes normalizing the SNR magnitude of each of the plurality of external devices.

14. The method of claim 13, further comprising:
  calculating a distance from the user to the plurality of external devices using the SNR magnitude of the each of the plurality of external devices; and
  normalizing the calculated distance using a maximum distance value.

15. The method of claim 11, further comprising:
  outputting a response to the voice signal through via at least one output device, when the electronic device is selected, based on the comparison.

16. The method of claim 12, wherein the weight is assigned based on a usage frequency of the user.

17. The method of claim 10, wherein the voice signal is processed using an acoustic module included in the electronic device or operatively coupled to the electronic device, and
  wherein the acoustic module is configured to implement machine learning using a learning algorithm.

18. The method of claim 10, wherein calculating a final probability value for a respective external device includes adding a first and the second probability values for the each of the plurality of external device.

* * * * *